US011812311B2

(12) United States Patent
Berliner et al.

(10) Patent No.: US 11,812,311 B2
(45) Date of Patent: Nov. 7, 2023

(54) SENSOR-BASED DETERMINATION OF A PROVISIONED ROUTE BEAM LIST

(71) Applicant: QUALCOMM Incorporated, San Diego, CA (US)

(72) Inventors: Ran Berliner, Kfar-Aviv (IL); Guy Wolf, Rosh Haayin (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 17/227,163

(22) Filed: Apr. 9, 2021

(65) Prior Publication Data

US 2022/0330102 A1 Oct. 13, 2022

(51) Int. Cl.
*H04W 16/28* (2009.01)
*H04W 36/00* (2009.01)
*H04W 72/044* (2023.01)

(52) U.S. Cl.
CPC ....... *H04W 36/0061* (2013.01); *H04W 16/28* (2013.01); *H04W 36/0083* (2013.01); *H04W 72/046* (2013.01)

(58) Field of Classification Search
CPC .............................. H04W 36/00; H04W 16/28
See application file for complete search history.

(56) References Cited

U.S. PATENT DOCUMENTS

2019/0053193 A1* 2/2019 Park ..................... H04J 11/0069
2019/0254064 A1   8/2019 Islam et al.
2019/0261193 A1   8/2019 Torsner et al.
2020/0029292 A1* 1/2020 Zou ..................... H04W 56/001
2021/0092584 A1* 3/2021 Zou ................... H04W 28/0226

FOREIGN PATENT DOCUMENTS

WO    WO-2019085782 A1    5/2019
WO    WO-2022036343 A1    2/2022

OTHER PUBLICATIONS

International Search Report and Written Opinion—PCT/US2022/018948—ISA/EPO—dated Jun. 1, 2022 (206096WO).

* cited by examiner

*Primary Examiner* — Michael T Vu
(74) *Attorney, Agent, or Firm* — Holland & Hart LLP/Qualcomm Incorporated

(57) ABSTRACT

Methods, systems, and devices for wireless communications are described. A base station in a network of base stations may determine a predicted route of a user equipment (UE) based on sensor data obtained by sensors coupled with the base station. A neighboring base station may be located along the predicted route and the base station may provision the neighboring base station with a subset of beams associated with the neighboring base station. The subset of beams may include beams with geographic coverage areas overlapping with the predicted route of the UE. The base station may add the subset of beams to a provisioned route beam list and may transmit the provisioned route beam list to the neighboring base station in a message. The neighboring base station may use the subset of beams indicated in the provisioned route beam list for beamforming communications with the UE.

30 Claims, 15 Drawing Sheets

SENSOR-BASED DETERMINATION OF A PROVISIONED ROUTE BEAM LIST

FIELD OF TECHNOLOGY

The following relates to wireless communications, including sensor-based determination of a provisioned route beam list.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support sensor-based determination of a provisioned route beam list. Generally, the described techniques provide for base stations to communicate beam information with other base stations, for example, based on predicted mobility of a user equipment (UE). A base station may be equipped with one or more sensors that the base station may use to obtain sensor measurements. The base station may determine a subset of a set of beams associated with a neighboring base station based on the sensor measurements. The base station may generate a beam list based on the subset of the set of beams associated with the neighboring base station and transmit the beam list to the neighboring base station. In some cases, the beam list may be an example of a provisioned route beam list, where the subset of beams included in the list are associated with a predicted route of mobility for one or more UEs. The neighboring base station may deactivate beams that are not included in the beam list and may perform a beam sweeping procedure using the subset of beams included in the beam list. The neighboring base station may select a beam from the subset of beams as a result of the beam sweeping procedure to use for communications with a UE (e.g., a UE moving along the predicted route).

A method for wireless communications at a first base station is described. The method may include obtaining a sensor measurement using one or more sensors at the first base station, generating a list of communication beams associated with a cell based on the sensor measurement, the cell being configured with a set of communication beams and the list of communication beams indicating a subset of the set of communication beams for the cell, and transmitting, to a second base station serving the cell, a message including the list of communication beams and a cell identifier for the cell.

An apparatus for wireless communications at a first base station is described. The apparatus may include a processor, memory coupled with the processor, and instructions stored in the memory. The instructions may be executable by the processor to cause the apparatus to obtain a sensor measurement using one or more sensors at the first base station, generate a list of communication beams associated with a cell based on the sensor measurement, the cell being configured with a set of communication beams and the list of communication beams indicating a subset of the set of communication beams for the cell, and transmit, to a second base station serving the cell, a message including the list of communication beams and a cell identifier for the cell.

Another apparatus for wireless communications at a first base station is described. The apparatus may include means for obtaining a sensor measurement using one or more sensors at the first base station, means for generating a list of communication beams associated with a cell based on the sensor measurement, the cell being configured with a set of communication beams and the list of communication beams indicating a subset of the set of communication beams for the cell, and means for transmitting, to a second base station serving the cell, a message including the list of communication beams and a cell identifier for the cell.

A non-transitory computer-readable medium storing code for wireless communications at a first base station is described. The code may include instructions executable by a processor to obtain a sensor measurement using one or more sensors at the first base station, generate a list of communication beams associated with a cell based on the sensor measurement, the cell being configured with a set of communication beams and the list of communication beams indicating a subset of the set of communication beams for the cell, and transmit, to a second base station serving the cell, a message including the list of communication beams and a cell identifier for the cell.

Some examples of the method, apparatuses, and non-transitory computer-readable medium described herein may further include operations, features, means, or instructions for receiving, from the second base station and in response to the message including the list of communication beams, a second message including an acknowledgment for the list of communication beams.

Some examples of the method, apparatuses, and non-transitory computer-readable medium described herein may further include operations, features, means, or instructions for predicting a route for a UE based on the sensor measurement, where the list of communication beams associated with the cell may be generated based on the predicted route for the UE.

Some examples of the method, apparatuses, and non-transitory computer-readable medium described herein may further include operations, features, means, or instructions for generating a second list of communication beams associated with a second cell based on the sensor measurement, the second cell being configured with a second set of communication beams and the second list of communication beams indicating a second subset of the second set of communication beams for the second cell, where the message further includes the second list of communication beams and a second cell identifier for the second cell and may be further transmitted to a third base station serving the second cell.

Some examples of the method, apparatuses, and non-transitory computer-readable medium described herein may further include operations, features, means, or instructions for generating a second list of communication beams associated with a second cell based on the sensor measurement, the second cell being configured with a second set of communication beams and the second list of communication beams indicating a second subset of the second set of communication beams for the second cell and transmitting, to a third base station serving the second cell, a second message including the second list of communication beams and a second cell identifier for the second cell.

Some examples of the method, apparatuses, and non-transitory computer-readable medium described herein may further include operations, features, means, or instructions for triggering handover of a UE on the cell, where the message including the list of communication beams may be transmitted to the second base station based on the triggered handover of the UE.

In some examples of the method, apparatuses, and non-transitory computer-readable medium described herein, the message including the list of communication beams further includes an identifier of the UE.

Some examples of the method, apparatuses, and non-transitory computer-readable medium described herein may further include operations, features, means, or instructions for updating radio resource management (RRM) information for the cell based on the sensor measurement, where the message including the list of communication beams may be transmitted to the second base station based on the updated RRM information for the cell.

In some examples of the method, apparatuses, and non-transitory computer-readable medium described herein, generating the list of communication beams associated with the cell may include operations, features, means, or instructions for determining the subset of the set of communication beams for the cell based on one or more sensor measurements including the sensor measurement, mobility information for a UE, historical beam usage information, historical UE mobility information, a location of the cell, a range of the cell, one or more interfering objects associated with the cell, beam coverage information for the cell, a machine learning algorithm, or a combination thereof.

In some examples of the method, apparatuses, and non-transitory computer-readable medium described herein, the one or more sensors include a camera assistance sensor, a radar support sensor, a positioning system sensor, or a combination thereof.

In some examples of the method, apparatuses, and non-transitory computer-readable medium described herein, the message may be transmitted to the second base station via an Xn interface.

Another method for wireless communications at a first base station is described. The method may include serving a cell using a set of communication beams configured at the first base station, receiving, from a second base station, a message including a list of communication beams and a cell identifier for the cell, the list of communication beams indicating a subset of the set of communication beams for the cell, and communicating with a UE using the subset of the set of communication beams based on the message including the list of communication beams.

An apparatus for wireless communications at a first base station is described. The apparatus may include a processor, memory coupled with the processor, and instructions stored in the memory. The instructions may be executable by the processor to cause the apparatus to serve a cell using a set of communication beams configured at the first base station, receive, from a second base station, a message including a list of communication beams and a cell identifier for the cell, the list of communication beams indicating a subset of the set of communication beams for the cell, and communicate with a UE using the subset of the set of communication beams based on the message including the list of communication beams.

Another apparatus for wireless communications at a first base station is described. The apparatus may include means for serving a cell using a set of communication beams configured at the first base station, means for receiving, from a second base station, a message including a list of communication beams and a cell identifier for the cell, the list of communication beams indicating a subset of the set of communication beams for the cell, and means for communicating with a UE using the subset of the set of communication beams based on the message including the list of communication beams.

A non-transitory computer-readable medium storing code for wireless communications at a first base station is described. The code may include instructions executable by a processor to serve a cell using a set of communication beams configured at the first base station, receive, from a second base station, a message including a list of communication beams and a cell identifier for the cell, the list of communication beams indicating a subset of the set of communication beams for the cell, and communicate with a UE using the subset of the set of communication beams based on the message including the list of communication beams.

Some examples of the method, apparatuses, and non-transitory computer-readable medium described herein may further include operations, features, means, or instructions for transmitting, to the second base station and in response to the message including the list of communication beams, a second message including an acknowledgment for the list of communication beams.

Some examples of the method, apparatuses, and non-transitory computer-readable medium described herein may further include operations, features, means, or instructions for deactivating a second subset of the set of communication beams based on the list of communication beams, the second subset of the set of communication beams being distinct from the subset of the set of communications beams indicated by the list of communication beams.

In some examples of the method, apparatuses, and non-transitory computer-readable medium described herein, communicating with the UE using the subset of the set of communication beams may include operations, features, means, or instructions for performing a beam sweeping procedure using the subset of the set of communication beams and selecting a communication beam of the subset of the set of communication beams to communicate with the UE based on the beam sweeping procedure.

Some examples of the method, apparatuses, and non-transitory computer-readable medium described herein may further include operations, features, means, or instructions for receiving, from the second base station, an indication to handover the UE on the cell, where the message including the list of communication beams may be received based on the indication to handover the UE on the cell.

In some examples of the method, apparatuses, and non-transitory computer-readable medium described herein, the message including the list of communication beams further includes an identifier of the UE.

In some examples of the method, apparatuses, and non-transitory computer-readable medium described herein, the message including the list of communication beams updates RRM information for the cell.

Some examples of the method, apparatuses, and non-transitory computer-readable medium described herein may further include operations, features, means, or instructions for obtaining a sensor measurement using one or more sensors at the first base station and determining a second subset of the set of communication beams based on the sensor measurement and the message including the list of communication beams. In some examples of the method, apparatuses, and non-transitory computer-readable medium described herein, communicating with the UE may include operations, features, means, or instructions for communicating with the UE using the determined second subset of the set of communication beams, the second subset of the set of communication beams including the subset of the set of communication beams.

In some examples of the method, apparatuses, and non-transitory computer-readable medium described herein, the message may be received from the second base station via an Xn interface.

DETAILED DESCRIPTION

Figure 1:
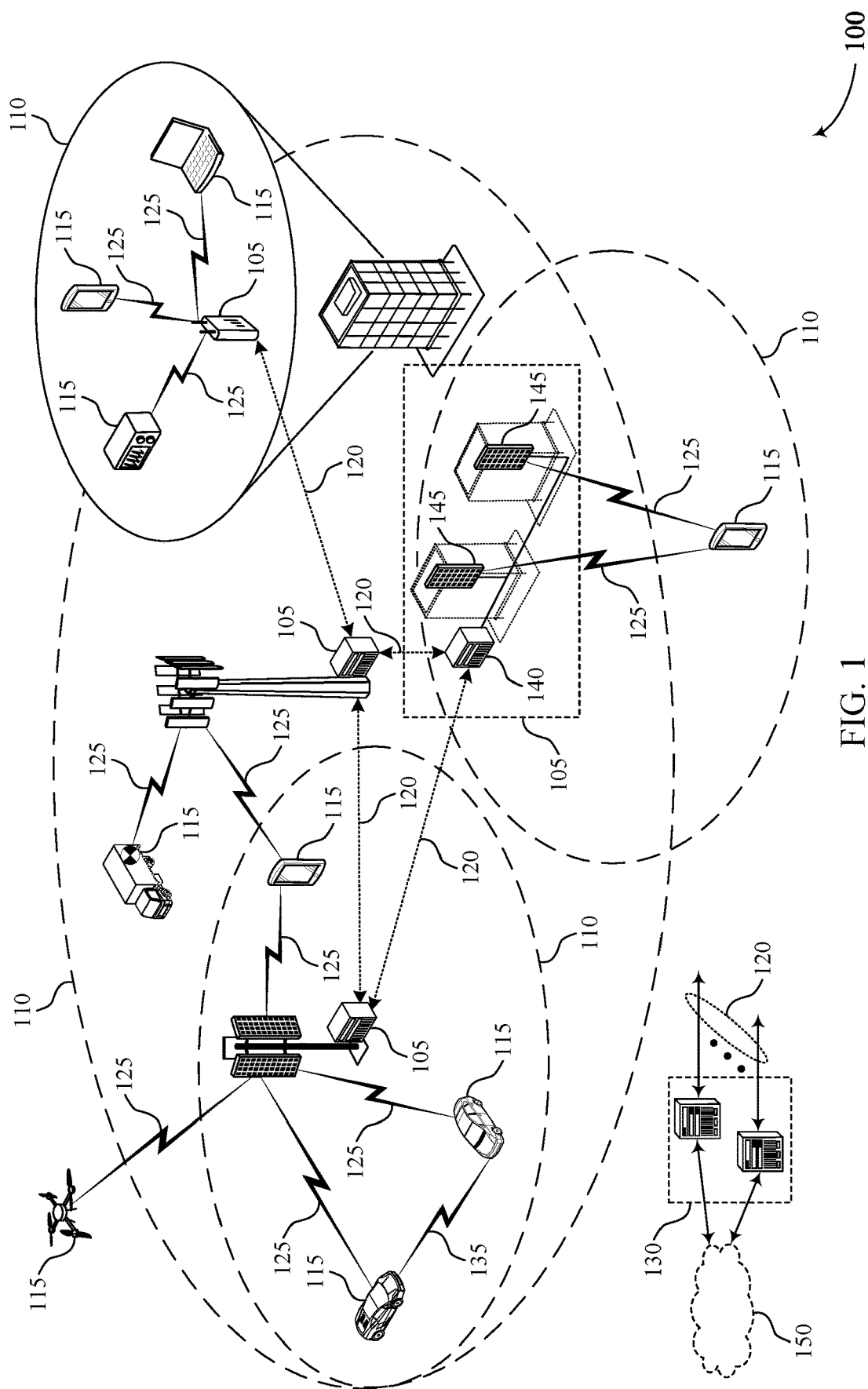
FIGS. 1 through 4 illustrate examples of wireless communications systems that support sensor-based determination of a provisioned route beam list in accordance with aspects of the present disclosure.

A wireless communications system may include multiple base stations, where each base station may serve a geographic coverage area (e.g., corresponding to a cell). In some examples, the wireless communications system includes base stations that are coupled with or include sensing equipment. The sensing equipment (e.g., one or more sensors) may be used to improve a performance of the wireless communications system. Some base stations may support communications over relatively higher frequency bands than other base stations. In some examples, a wireless communications system that supports communications over relatively high frequency bands (e.g., millimeter wave (mmW) or sub-Terahertz bands) may employ an increased quantity of base stations to cover a geographic region (e.g., as compared to a system supporting communications over relatively lower frequency bands). However, supporting an increased quantity of base stations may increase a power consumption of the network. Additionally or alternatively, supporting an increased quantity of base stations may increase an amount of intercell interference and may increase complexity related to managing user equipment (UE) mobility (e.g., handover), among other issues. For example, UEs may frequently switch between cells in the system, and a base station for each cell may perform beamforming operations to determine a communication beam to use for communicating with a UE. Such beamforming operations may involve significant processing overhead and latency due to a relatively large number of beams configured for each cell (e.g., above a threshold number of beams) and the frequent movement of UEs between cells and within a cell.

In some wireless communications systems, the network may effectively reduce a power consumption and intercell interference across the network by predicting the route of a UE using one or more sensors. A provisioning base station may be equipped with one or more sensors, such as a camera assistance sensor, a radar support sensor, a positioning system sensor, or any combination of these or other sensors. The provisioning base station may obtain sensor measurements from the sensors that indicate information such as traffic flow, pedestrian traffic, geographic information (e.g., location of roads, crosswalks, buildings), or any other information related to the sensor measurements. The obtained sensor measurements may be used—for example, in conjunction with a machine learning algorithm, coverage patterns of one or more neighboring base stations, or both—to determine a predicted route for a UE. For example, based on the obtained sensor measurements, the provisioning base station may determine that a specific neighboring base station lies along the predicted route for the UE. The provisioning base station may provision the neighboring base station with a specific set of beams for communicating with the UE. The provisioned beams may be a subset of the set of beams that cover the geographic area of the provisioned base station's cell and may align with the predicted route of the UE. In some examples, the provisioning base station may add the subset of beams for the provisioned base station to a provisioned beam route list, where the list may include multiple subsets of provisioned beams for multiple provisioned base stations identified along the predicted route for the UE.

The provisioning base station may transmit the provisioned beam route list as part of a handover procedure, as part of an exchange of radio resource management (RRM) information, or both. The provisioned base stations may receive the provisioned route beam list and transmit an acknowledgment (ACK) message to the provisioning base station to indicate that the provisioned route beam list is successfully received. In some examples, a provisioned base station may deactivate beams (e.g., transmit beams, receive beams, or both) not included in the subset of beams received from the provisioning base station. The provisioned base station may perform beamforming procedures, including a beam sweep procedure to determine a set of beams for communications with a UE, using the subset of beams included in the provisioned route beam list. Based on the beamforming procedures, the provisioned base station may select a beam from the subset of beams included in the provisioned route beam list to use to communicate with the UE. In some cases, the predicted route and the provisioned beam list may correspond to a specific UE. In some other cases, the predicted route and the provisioned beam list may be common across multiple UEs. The provisioned base station may save power and reduce intercell interference by cycling through a smaller set of active beams when determining which beam(s) to use for communications with a UE.

In some examples, the network may utilize machine learning techniques to determine a real-time, environment-based coverage pattern of a set of base stations based on information received from the base stations' sensors (e.g., cameras, radar, positioning sensors, or other sensors). In some cases, the coverage pattern may include geographic coverage on a per-beam basis. That is, the network may determine the geographic coverage of each beam in each set of beams associated with a base station serving a given cell. Based on the sensor measurements obtained by a base station's sensors, the base station may determine street layouts, traffic patterns, the speed or direction of a UE, or any combination thereof. The base station may input such information (e.g., beam coverage patterns, geographic information, historical UE information) into a machine learning algorithm (e.g., a neural network or other algorithm) to determine a predicted route of a UE. In some cases, the machine learning algorithm may be trained offline. In some other cases, the machine learning algorithm may continue to be trained based on actual UE routes, beamforming information, or a combination thereof. In some cases, the base stations may use a common machine learning algorithm. In some other cases, a base station may tune a base station-specific machine learning algorithm (e.g., based on online training at the base station). A provisioning base station may use one or more machine learning algorithms to predict a UE's route, predict a common route for a set of UEs, predict a subset of beams for a cell associated with a predicted UE route, or predict any combination thereof.

Aspects of the disclosure are initially described in the context of wireless communications systems. Aspects of the disclosure are also described in the context of process flows showing signaling exchanges between wireless devices. Aspects of the disclosure are further illustrated by and described with reference to apparatus diagrams, system diagrams, and flowcharts that relate to sensor-based determination of a provisioned route beam list for base stations.

FIG. 1 illustrates an example of a wireless communications system 100 that supports sensor-based determination of a provisioned route beam list in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in some examples in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may support techniques for determining a provisioned route beam list based on sensor measurements obtained at a first base station 105. The first base station 105 may determine a predicted route for a UE 115 based on obtained sensor measurements. The first base station 105 may determine, for each set of communication beams (e.g., transmit beams, receive beams, or both) associated with a provisioned base station 105 along the predicted route, a subset of relevant beams based on the obtained sensor measurements. The first base station 105 may generate the provisioned route beam list based on each subset of beams and transmit one or more messages including the provisioned route beam list (e.g., for a specific base station 105 or for multiple base stations 105) to the provisioned base stations 105 along the predicted route.

The provisioned base stations 105 may receive the one or more messages and may transmit ACK messages to the first base station 105 via a backhaul interface (e.g., Xn interface) if a message including the provisioned route beam list is successfully received. The provisioned base stations 105 may deactivate communication beams not included in the provisioned route beam list and may perform beamforming operations (e.g., including beam sweeping operations) using the communication beams included in the provisioned route beam list. Based on the beam sweeping procedures, the provisioned base stations 105 may select communication beams to use to communicate with a UE 115.

Figure 2:
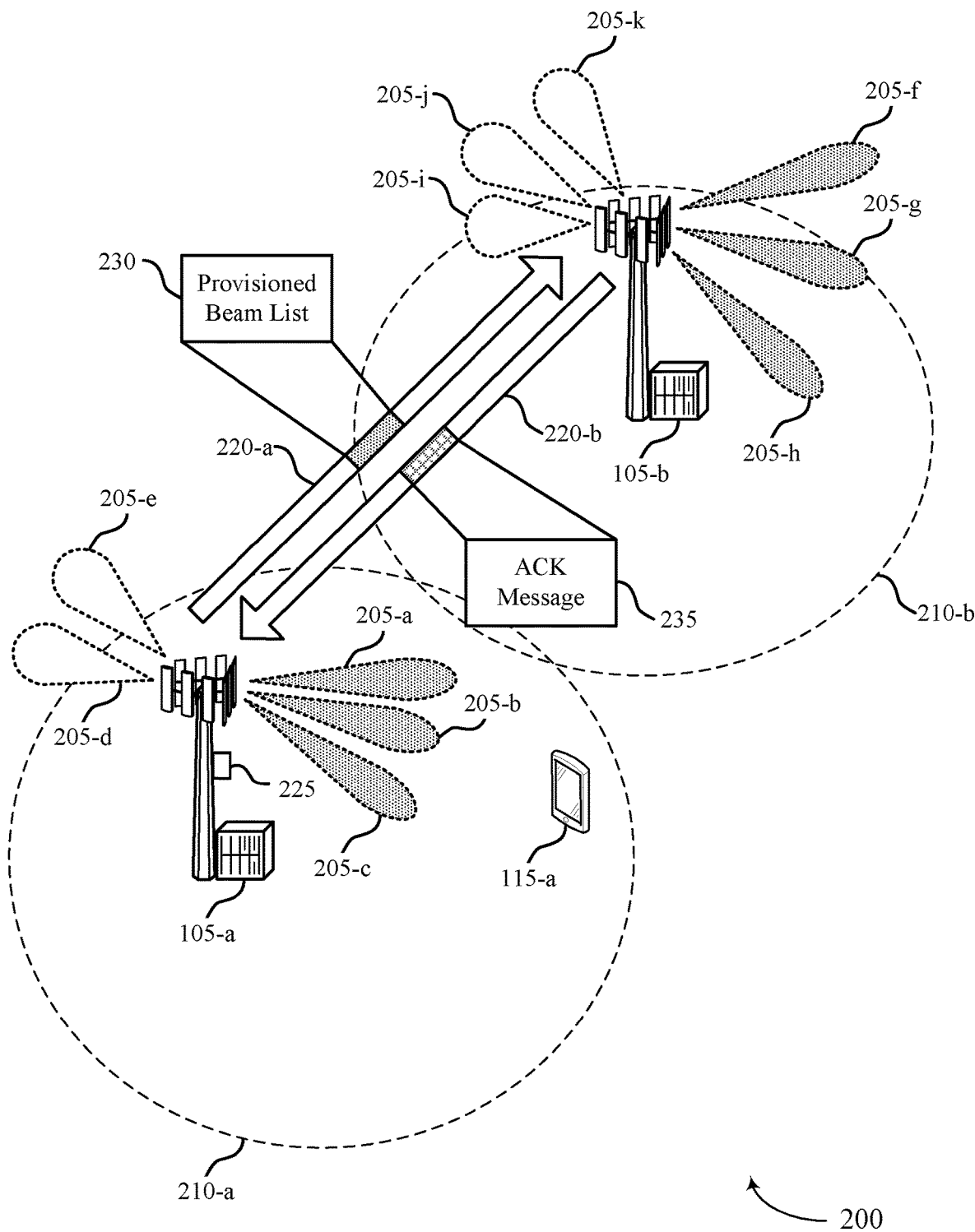

FIG. 2 illustrates an example of a wireless communications system 200 that supports sensor-based determination of a provisioned route beam list in accordance with aspects of the present disclosure. In some examples, the wireless communications system 200 may implement aspects of a wireless communications system 100. The wireless communications system 200 may include a UE 115-a, which may be an example of a UE 115 as described with respect to FIG. 1. The wireless communications system 200 may also include base stations 105-a and 105-b, which may be examples of base stations 105 as described with respect to FIG. 1. The base stations 105-a and 105-b may communicate with each other using backhaul interfaces 220-a and 220-b, as described with respect to FIG. 1. Each base station 105-a and 105-b may use a set of communication beams 205 to serve a respective cell 210-a and 210-b.

The base station 105-a may communicate with a UE 115-a using the set of communication beams 205 when the UE-115-a is positioned within the cell 210-a. The base station 105-a may perform beam sweeping procedures in order to select a beam from the set of beams 205 for communication with the UE 115-a. For example, the base station 105-a may evaluate multiple beams 205 serving the cell 210-a (e.g., beam 205-a, beam 205-b, beam 205-c, beam 205-d, and beam 205-e) during a beam sweeping procedure and determine to use a specific communication beam (e.g., beam 205-b) to communicate with the UE 115-a. The determined communication beam may be used by the base station 105-a to transmit signals to the UE 115-a, receive signals from the UE 115-a, or both. However, if the number of beams 205 configured for a cell 210 is relatively large (e.g., above a threshold number of beams), beam sweeping procedures may involve significant power consumption based on the processing overhead and latency associated with testing communication metrics for the relatively large number of beams 205.

In some wireless communications systems 200, the network (e.g., a wireless communications network including the base station 105-a and the base station 105-b) may effectively reduce a power consumption and intercell interference across the network by predicting the route of a UE 115 using one or more sensors, such as sensors 225. The base station 105-a may be equipped with one or more sensors 225, such as a camera assistance sensor, a radar support sensor, a positioning system sensor, or any combination of these or other similar sensors. The base station 105-a may obtain sensor measurements from sensors 225, indicating information such as traffic flow, pedestrian traffic, geographic information (e.g., location of roads, crosswalks, buildings), or any other information related to sensor measurements, the proximate environment, UE interactions, or a combination thereof. The base station 105-a may also obtain information relating to a coverage pattern for a neighboring base station 105, such as the base station 105-b, from the network or based on sensor measurements. The coverage pattern of the neighboring base station 105-b may include the geographic coverage of the set of beams 205 associated with the base station 105-b, for example, on a per-beam basis. The coverage pattern for the base station 105-b may include the geographic area covered by each of beam 205-f, beam 205-g, beam 205-h, beam 205-i, beam 205-j, and beam 205-k.

The obtained sensor measurements may be used—for example, in conjunction with a machine learning algorithm and the coverage pattern of the neighboring base station 105-b—to determine a predicted route for a UE such as the UE 115-a. For example, based on the obtained sensor measurements, the base station 105-a may determine that the base station 105-b lies along the predicted route for the UE 115-a. Further, the base station 105-a may determine which beams of the set of beams 205 associated with the base station 105-b overlap with the predicted route for the UE 115-a. Accordingly, the base station 105-a may provision the base station 105-b with a specific set of beams 205 for communicating with the UE 115-a moving according to the predicted route.

In some examples, the base station 105-a may predict a specific route for a UE 115-a or a set of UEs 115. In some other examples, the base station 105-a may predict one or more areas or regions in which a UE 115-a or UEs 115 may likely be located. For example, based on obtained sensor measurements, such as global positioning system (GPS) data or other positioning information that shows a relatively large number of UEs 115 in the direction of beams 205-f, 205-g, and 205-h, the base station 105-a may predict that the UE 115-a may be located in the direction of beams 205-f, 205-g, and 205-h. Because beams 205-f, 205-g, and 205-h overlap with the predicted location of the UE 115-a (e.g., a predicted route, a predicted region), the base station 105-a may add the subset of beams 205-f, 205-g, and 205-h to a provisioned beam list 230. Beams 205-i, 205-j, and 205-k may not be added to the provisioned beam list 230 if the geographic coverage areas of each of the beams 205-i, 205-j, and 205-k do not overlap with the predicted location of the UE 115-a. In some cases, the base station 105-a may determine a predicted location (e.g., predicted route, predicted region) for the UE 115-a that corresponds to multiple neighboring cells 210 (e.g., associated with more than one neighboring base station 105). In such an example, the base station 105-a may add provisioned beams for multiple cells 210 (e.g., along a predicted route) to a message including the provisioned beam list 230, as described in further detail with reference to FIG. 4.

The base station 105-a may send a message that includes the provisioned beam list 230 to the base station 105-b via a backhaul interface 220-a (e.g., an Xn interface). The message may include multiple fields indicating values associated with the provisioned beam list 230. For example, the message may include a field or set of fields indicating a list of cell identifiers for the cells 210 associated with base stations 105 provisioned by the base station 105-a (e.g., including the cell identifier for the cell 210-b served by the base station 105-b). The message may further include a field or set of fields indicating the provisioned beams 205 associated with each provisioned cell (e.g., beams 205-f, 205-g, and 205-h for the cell 210-b). The message may indicate the provisioned beams 205 using beam identifiers, beam directions, precoding information, or any combination thereof.

In some cases, the base station 105-a may transmit the message including the provisioned beam list 230 when a handover to the base station 105-b has been triggered. In some such cases, the UE identifier of the UE 115 associated with the handover procedure (e.g., the UE identifier of the UE 115-a moving from the cell 210-a to the cell 210-b) may be included as a field in the message. In some other cases, the base station 105-a may transmit the message including the provisioned beam list 230 when an update occurs, such as an update to RRM information for the base station 105-a, the base station 105-b, or both. The sensor measurements obtained at the base station 105-a may change, for example, and instead of indicating that UEs 115 are commonly located on the side of the base station 105-b with beams 205-f, 205-g, and 205-h, the sensor measurements may indicate that UEs are commonly located in the direction of beams 205-i and 205-j. In some such cases, the base station 105-a may update RRM information and transmit the message including an updated provisioned beam list 230 based on updating the RRM information associated with the cell 210-b.

The base station 105-b may receive the message including the provisioned beam list 230 and may transmit an ACK message 235 to the base station 105-a in response via a backhaul interface 220-b (e.g., an Xn interface). The ACK message 235 may be an example of a hybrid automatic repeat request (HARQ) ACK message or another message indicating successful receipt of the message including the provisioned beam list 230. The base station 105-b may deactivate beams not included in the provisioned beam list 230, such as beams 205-i, 205-j, and 205-k. The base station 105-b may perform beam sweeping procedures using the beams 205-f, 205-g, and 205-h included in the provisioned beam list 230 (e.g., a provisioned route beam list). In some cases, the base station 105-b may perform beam sweeping procedures according to an order indicated in the provisioned route beam list. For example, the beams may be included in the provisioned route beam list according to the order: beam 205-h, beam 205-g, beam 205-f (e.g., due to the predicted mobility of the UE 115-a). Based on this order, the base station 105-b may perform a beam sweeping procedure using beams corresponding to a similar direction as beam 205-h first. The base station 105-b may select beam 205-h and may initially communicate with the UE 115-a using beam 205-h. As the UE 115-a moves along a path (e.g., a predicted route), the base station 105-b may switch to using a next beam on the list, beam 205-g (e.g., if one or more quality metrics for beam 205-h fail to satisfy a threshold, one or more quality metrics for beam 205-g satisfy a threshold, one or more quality metrics for beam 205-g satisfy a comparison criteria as compared to one or more quality metrics for beam 205-h, or some combination thereof).

Based on the results of the beam sweeping procedure, the base station 105-b may select a beam 205 (e.g., beam 205-g) as the beam to use to communicate with the UE 115-a. By performing beam sweeping procedures according to the provisioned beam list 230, the base station 105-b may check beams 205 from the subset of beams 205 included in the provisioned beam list 230 as opposed to a full set of beams 205 for the base station 105-b, which may reduce a power consumption and processing latency associated with beamforming at the base station 105-b. Once the base station 105-b selects a beam 205, such as the beam 205-g, based on the beam sweeping procedures, the base station 105-b may communicate with the UE 115-a using the selected beam 205-g.

In some examples, the base station 105-a may determine a provisioned set of beams for the cell 210-a (e.g., as well as one or more neighboring cells 210). For example, the base station 105-*a* may determine that beams 205-*a*, 205-*b*, and 205-*c* correspond to a predicted route for the UE 115-*a*. Additionally, the predicted route carries over into the cell 210-*b* and corresponds to beams 205-*h*, 205-*g*, and 205-*f* in the cell 210-*b*. Accordingly, the base station 105-*a* may activate beams 205-*a*, 205-*b*, and 205-*c* for beamforming procedures with the UE 115-*a* and may transmit the message including the provisioned beam list 230 to the base station 105-*b*, such that the base station 105-*b* activates beams 205-*h*, 205-*g*, and 205-*f* for beamforming procedures with the UE 115-*a* (e.g., upon handover of the UE 115-*a* from the first cell 210-*a* to the second cell 210-*b*).

Figure 3:
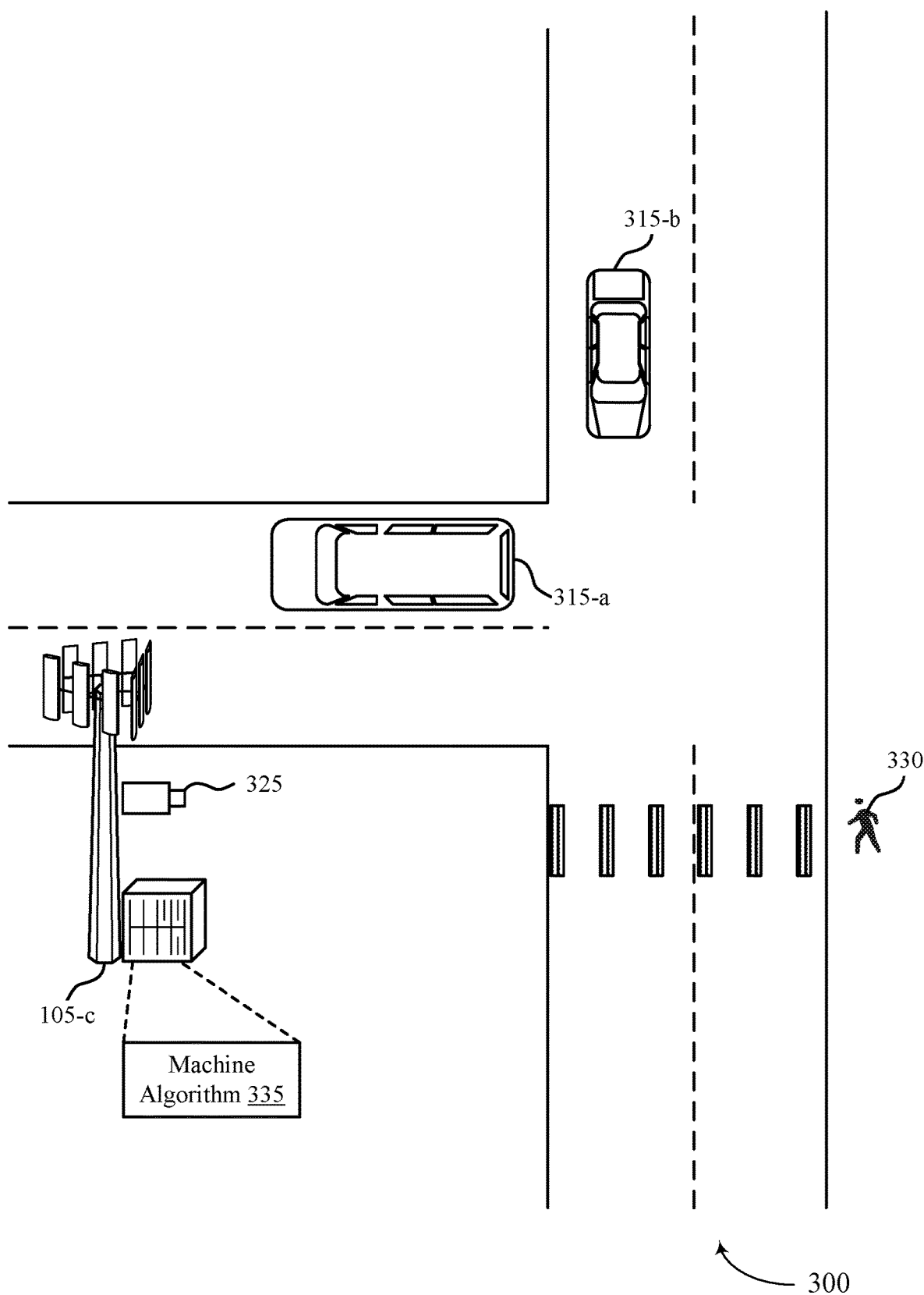

FIG. 3 illustrates an example of a wireless communications system 300 that supports sensor-based determination of a provisioned route beam list in accordance with aspects of the present disclosure. The wireless communications system 300 may implement aspects of a wireless communications system 100 or 200. For example, the wireless communications system 300 may include a UE 315-*a* and a UE 315-*b*, which may be examples of vehicles (e.g., smart vehicles), such as buses or cars, and which may be examples of the UEs 115 as described with reference to FIGS. 1 and 2. The wireless communications system 300 may also include a base station 105-*c*, which may be an example of a base station 105 as described with reference to FIGS. 1 and 2. A sensor 325 may be implemented at a base station 105, as a functional component in communication with a base station 105, or otherwise coupled with a base station 105.

The base station 105-*c* may be equipped with one or more sensors 325 that are capable of detecting UEs 315 (e.g., such as the UEs 315-*a* and 315-*b*), determining mobility information about the detected UEs 315, or both. In some examples, a sensor 325 may include a camera that identifies the UEs 315 and is used to determine a position, velocity, or both of the UEs 315. A sensor 325 may additionally or alternatively include radar equipment, lidar equipment, or both to determine a position and velocity of the UEs 315. A sensor 325 may additionally or alternatively include GPS equipment that may be used to determine a position and velocity of the UEs 315 (e.g., based on GPS data received from the UEs 315). A sensor 325 may additionally or alternatively include signal processing components that enable the base station 105-*c* to determine a position of the UEs 315 based on determining a time of arrival (TOA) and direction of arrival (DOA) of signals transmitted from the UEs 315, the direction of the beams selected for communication with the UEs 315, or both. In some examples, a sensor 325 may include any combination of sensing equipment, among other examples, where equipment that serves similar purposes (e.g., redundant equipment) and is included in the sensor 325 may be used to refine a position estimate, velocity estimate, or both for the UEs 315.

In some examples, in addition or alternative to obtaining position and velocity for the UEs 315 from the sensors 325, the base station 105-*c* may obtain geographic information, temporal information, or both. For example, a sensor 325 may obtain street layouts, automobile traffic patterns for a time of day (e.g., the base station 105-*c* may determine that the UEs 315 are likely to follow the highest traveled route for that time of day), road closures, current traffic information, or any combination thereof. In some examples, the base station 105-*c* may use the position and velocity information determined for the UEs 315 in combination with the determined geographic information, temporal information, or both to determine a predicted route for one or more UEs 315, as described in more detail with reference to FIG. 4. In some other examples, the base station 105-*c* may use the obtained sensor measurements to determine which beams of a neighboring base station to add to a provisioned route beam list, based on the output of a machine learning algorithm 335.

In some examples, the base station 105-*c* may be aware of neighboring base station deployment. For example, the base station 105-*c* may receive cell locations, cell ranges, interfering objects per cell, beam coverages, or any combination thereof from the network. Regarding beam coverages, the base station 105-*c* may use a machine learning algorithm 335 to determine a coverage pattern on a per-beam basis. That is, the base station 105-*c* may determine a coverage area of each beam of a set of beams supported by one or more of its neighboring base stations. The base station 105-*c* may use the machine learning algorithm 335 to determine which beams of the neighboring base stations may be added to a provisioned route beam list. The machine learning algorithm 335 may be trained to use a position of the UEs 315, a velocity of the UEs 315, a direction that the UEs 315 may be headed, temporal traffic patterns, street layouts, road closures, current traffic information, or any combination thereof. The base station 105-*c* may input one or more of these parameters into the machine learning algorithm 335. The machine learning algorithm 335 may leverage knowledge of the beam coverage of neighboring cells to determine which beams cover geographic areas where the UEs 315 may be projected to move. For example, based on pedestrian traffic 330, the street layout, and the traffic pattern, the machine learning algorithm 335 may generate a result indicating a first set of beams, associated with a neighboring base station, pointing towards the road the UE 315-*a* is traveling along. The base station 105-*c* may also determine that a second set of beams associated with the same base station point away from the road and therefore may be underutilized because the second subset of beams may not overlap with the predicted route. Accordingly, the base station 105-*c* may determine to add the first set of beams to a provisioned route beam list and may refrain from adding the second set of beams to the provisioned route beam list.

In some examples, the machine learning algorithm 335 is a pre-trained model, a reinforced learning model (e.g., a model that is refined during operation), a federated learning model (e.g., a model that is updated based on feedback from a large quantity of UEs), or a combination thereof. In some examples, the machine learning algorithm 335 may include an artificial neural network that is used to model the trajectory of the UEs. In some examples, available network information, such as a road network, may be used to prune the artificial neural network. Additionally or alternatively, available mobility-based traffic information may be used to pre-condition the artificial neural network. In some examples, procedures for training the artificial neural network may include using backhaul communications to confirm a predicted trajectory of the UEs. In some examples, the artificial neural network is distributed among base stations such as the base station 105-*c*.

Figure 4:
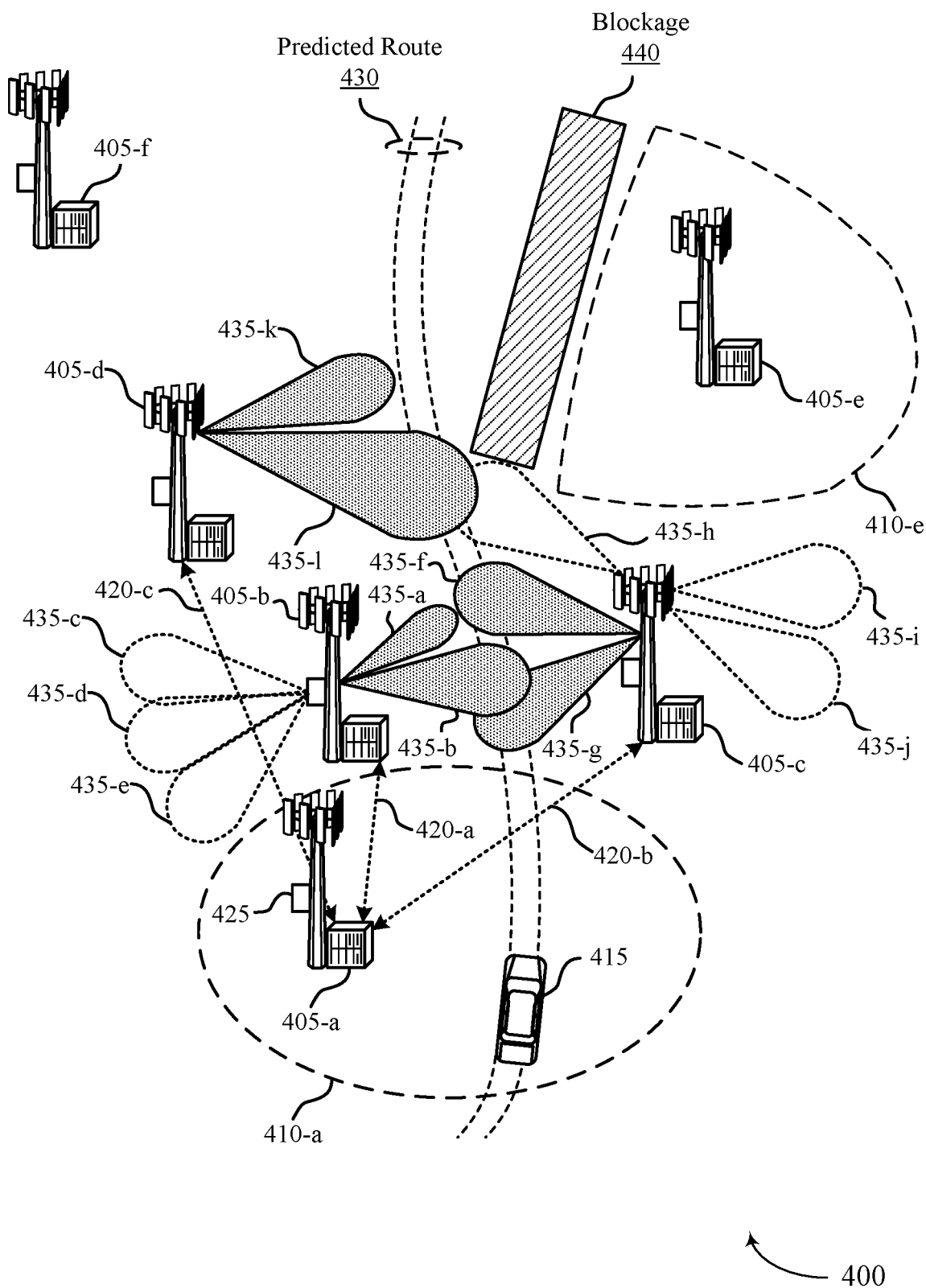

FIG. 4 illustrates an example of a wireless communications system 400 that supports sensor-based determination of a provisioned route beam list in accordance with aspects of the present disclosure. The wireless communications system 400 may include multiple base stations 405 and a UE 415, which may be examples of base stations 105 and a UE 115, respectively, as described with reference to FIGS. 1 through 3. The base stations 405 may each be associated with a set of beams 435 that the base stations 405 may use to communicate with the UE 415 when the UE 415 is positioned within a respective coverage area of beams 435, as similarly described with reference to FIG. 2. Also, the base stations 405 may communicate with one another and a network entity using backhaul interfaces 420 (e.g., Xn interfaces), as similarly described with reference to FIG. 2. The UE 415 may be an example of a smart vehicle (e.g., a car), a personal electronic device, or any other wireless communication device.

A network of base stations 405 may be deployed to cover a geographic region. Each base station 405 may be associated with a set of beams 435, where each beam 435 covers a geographic area. The UE 415 may enter a cell 410-a served by the base station 405-a. The base station 405-a may be equipped with one or more sensors 425, as similarly described with reference to FIG. 3. The base station 405-a may be aware of the deployment of neighboring base stations 405, such as the location of a neighboring cell served by a base station 405, a neighboring cell's range, interfering objects in a cell, beam coverage of a cell, or any combination thereof. For example, each of the base stations 405 may determine various cells (e.g., boundaries of their cells, cell ranges) based on data obtained using network information, attached sensing equipment, channel information reported by UEs such as the UE 415, or any combination thereof. For example, the base station 405-e may identify a blockage 440 using a sensor such as a camera or based on signaling with one or more UEs 415. For example, the base station 405-e may identify the blockage 440 based on determining that UEs on the other side of the blockage 440 are losing a connection with the base station 405-e or reporting that the channel quality is relatively poor (e.g., below a threshold quality metric). The base stations 405 may send information regarding the boundaries of their cells to each other or to another network entity via backhaul interfaces 420 (e.g., Xn interfaces). The network entity or the base station 405-a may use the information to determine a coverage pattern for the network of base stations 405, identifying which base stations 405 cover which regions of a larger geographic area. A coverage pattern may thus include multiple cells associated with corresponding base stations. The network entity or the base station 405-a may also determine the coverage pattern on a per-beam basis. That is, the network entity or the base station 405-a may determine coverage areas for individual beams 435 that make up the multiple sets of beams 435 supported by the base stations 405.

The base station 405-a may compare a predicted route 430 with the coverage pattern determined for the network of base stations 405—e.g., by overlaying the predicted route 430 over the coverage pattern or otherwise associating the predicted route 430 with coverage areas for one or more beams 435. Thus, the base station 405-a may determine which cells 410 served by which base stations 405 the UE 415 may be projected to travel through. The base stations 405 of these cells 410, such as the base station 405-b, the base station 405-c and the base station 405-d, may be provisioned by the base station 405-a. For example, the base station 405-a may add the beams 435 that have geographic coverage areas that overlap with the predicted route 430 of the UE 415 to a provisioned route beam list and may transmit the provisioned route beam list to the provisioned base stations 405 (e.g., base stations 405-b, 405-c, and 405-d).

In some cases, the base station 405-a may determine which beams 435 of provisioned base stations 405-b, 405-c, and 405-d overlap with the predicted route 430 of the UE 415. The base station 405-a may use sensor measurements obtained by one or more sensors 425 and a machine learning algorithm to determine that beams 435-a and 435-b associated with the base station 405-b may be added to the provisioned route beam list. Additionally or alternatively, beams 435-g and 435-f, associated with the base station 405-c may also be added to the provisioned route beam list, and beams 435-k and 435-1 may also be added to the provisioned route beam list. As described in further detail in FIG. 2, the base station 405-a may transmit a message that includes the provisioned route beam list to the base stations 405-b, 405-c and 405-d via backhaul interfaces 420-a, 420-b, and 420-c respectively. In some examples, the base station 405-a may transmit a message including the provisioned beams 435 for each of the provisioned base stations 405 with cell identifiers indicating the cell 410 corresponding to each provisioned beam 435. In some other examples, the base station 405-a may transmit base station-specific (e.g., cell-specific) messages including the provisioned beams 435 for a specific cell 410, such that a different message is transmitted to each of the base stations 405-b, 405-c, and 405-d. Upon receipt of the message, the base stations 405-b, 405-c, and 405-d may transmit an ACK message via backhaul interfaces 420-a, 420-b, and 420-c to indicate the base stations 405 successfully received the message.

In addition, the base station 405-b may deactivate the beams that are not included in the provisioned route beam list, such as beams 435-c, 435-d, and 435-e. Similarly, the base station 405-c may deactivate beams 435-h, 435-i, and 435-j. These beams may not have been included in the provisioned route beam list because the geographic coverage area of such beams 435 do not overlap with the predicted route 430 of the UE 415.

In some examples, the base station 405-a may not have provisioned one or more neighboring base stations, such as the base station 405-f, because the predicted route 430 of the UE 415 does not pass through the cell served by the base station 405-f. In some such examples, the base station 405-a may not transmit the message with the provisioned route beam list to the base station 405-f. Additionally, based on the detected blockage 440 (e.g., detected using one or more sensors 425), the base station 405-a may determine that the cell 410-e for the base station 405-e is blocked from covering the predicted route 430. Accordingly, the base station 405-a may refrain from provisioning the base station 405-e with any beams 435 associated with the predicted route 430.

The base stations 405-b, 405-c, and 405-d may perform beam sweeping procedures on the beams 435 included in the provisioned route beam list and may each select a beam 435 to use to communicate with the UE 415 as the UE 415 travels along the predicted route 430. Using the provisioned route beam list may improve efficiency and decrease power consumption and interference within the network because each base station 405 may evaluate a lesser quantity of beams when performing beam sweeping procedures.

Figure 5:
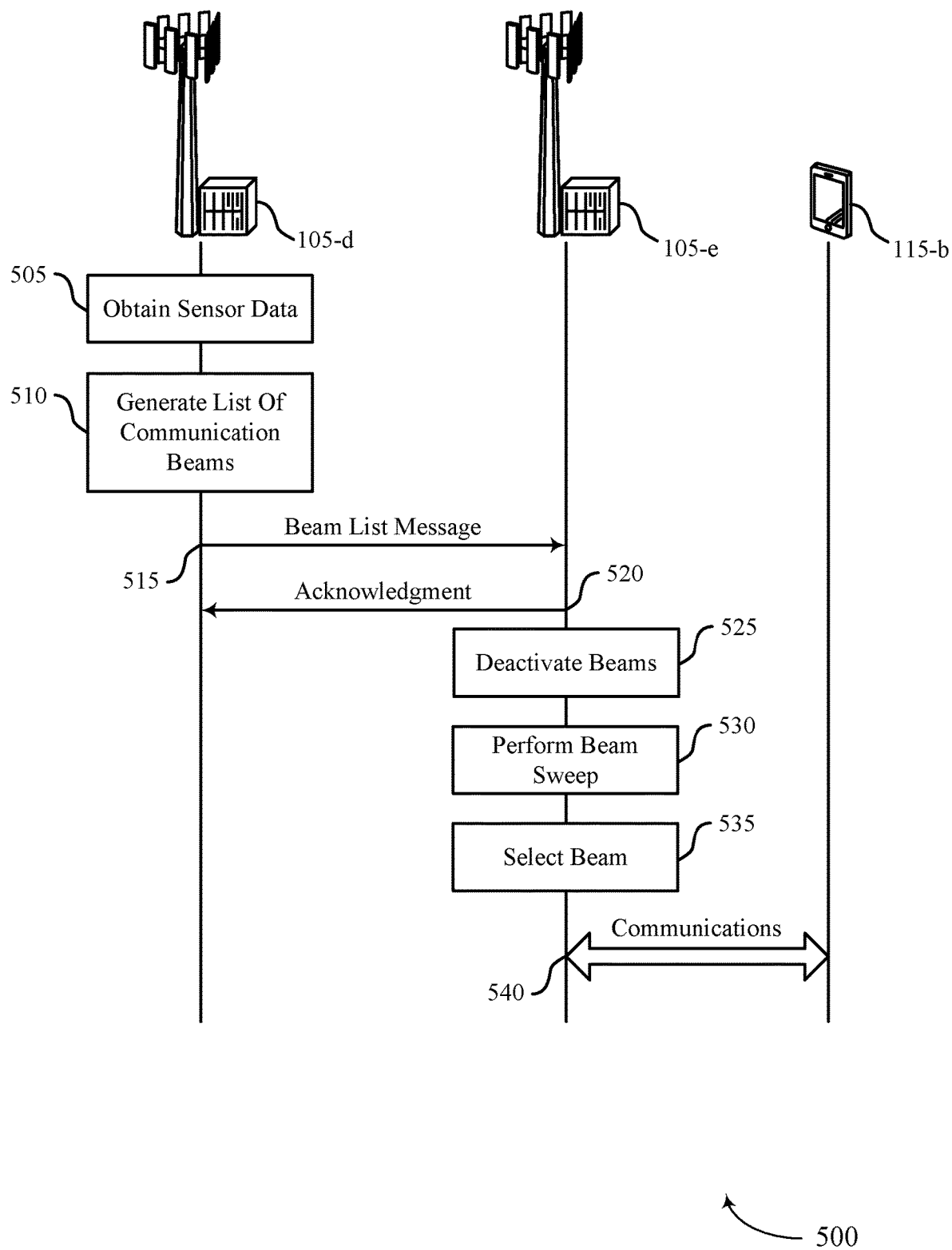
FIG. 5 illustrates an example of a process flow that supports sensor-based determination of a provisioned route beam list in accordance with aspects of the present disclosure.

FIG. 5 illustrates an example of a process flow 500 that supports sensor-based determination of a provisioned route beam list in accordance with aspects of the present disclosure. In some examples, the process flow 500 may implement aspects of a wireless communications system 100, a wireless communications system 200, a wireless communications system 300, or a wireless communications system 400 as described with reference to FIGS. 1 through 4. The process flow 500 may include a UE 115-b and base stations 105-d and 105-e, which may be examples of a UE and base stations as described with respect to FIGS. 1 through 4. Alternative examples of the following may be implemented, where some processes are performed in a different order than described or are not performed at all. In some cases, processes may include additional features not mentioned below, or further processes may be added.

At 505, the base station 105-d may obtain sensor measurements using one or more sensors. For example, the base station 105-d may be equipped with—or otherwise coupled to—the one or more sensors. The base station 105-d may input the obtained sensor measurements into a machine learning algorithm, which may output predictive information associated with the movement of the UE 115-b. The predictive information may be a predicted route for the UE 115-b determined by the base station 105-d. For example, based on the predicted route, the UE 115-b may pass through a cell served by the base station 105-e, where the base station 105-e may be associated with a set of beams that cover the geographic area of the cell. The base station 105-d may determine a subset of the set of beams associated with the base station 105-e that overlap with the predicted route of the UE 115-b. In some cases, the predicted route may be specific to the UE 115-b. In some other cases, the predicted route may be common across multiple UEs 115.

At 510, the base station 105-d may generate a list of communication beams (e.g., a provisioned route beam list), by adding the subset of the set of beams associated with the UE 115-b (e.g., the predicted route of the UE 115-b, a predicted positioning or area for the UE 115-b) to the list of communication beams.

At 515, the base station 105-d may transmit a message that includes the generated list of communication beams and an identifier of the cell associated with the base station 105-e to the base station 105-e. The message may be transmitted via a backhaul interface between the base station 105-d and the base station 105-e.

In some cases, the base station 105-d may generate a second list of communication beams associated with a second cell served by a third base station (not shown). Similar to the first list of communication beams, the base station 105-d may determine that the predicted route of the UE 115-b may pass through the second cell served by the third base station. Accordingly, the base station 105-d may determine a second subset of the second set of beams associated with the second cell and may generate the second list of communication beams by adding the second subset of beams associated with the second cell to the list. In some examples, the base station 105-d may add the second list of communication beams to the message transmitted at 515 and—in addition to transmitting the message to the base station 105-e—may also transmit the message to the third base station (not shown). In some other examples, the base station 105-d may generate a second, separate message that includes the second list of communication beams (e.g., specific to the cell served by the third base station) and may transmit the second message to the third base station.

In some cases, the UE 115-b may trigger a handover from the base station 105-d to the base station 105-e. In some such cases, the base station 105-d may transmit the message based on the triggering of the handover. The base station 105-d may include an identifier of the UE 115-b in the message (e.g., to associate the provisioned beams with a specific UE 115 being handed over from the base station 105-d to the base station 105-e). In some other cases, the base station 105-d may determine that RRM information is to be updated for the cell associated with the base station 105-e (e.g., based on the obtained sensor measurements). The base station 105-d may transmit the message to the base station 105-e based on the updating of the RRM information.

At 520, the base station 105-e may transmit, in response to the base station 105-d, an ACK message indicating successful receipt of the list of communication beams. In some cases, the base station 105-e may also be equipped with sensors and may perform its own sensor measurements. The base station 105-e may determine a different subset of the set of beams associated with the base station 105-e based on the sensor measurements obtained by the base station 105-e and the message received from the base station 105-d. The base station 105-e may determine to use the different subset of the set of beams associated with the base station 105-e as opposed to the first subset of beams received from the base station 105-d. For example, the base station 105-e may perform sensor measurements itself and, combined with the message received from the base station 105-d that includes a provisioned route beam list, the base station 105-e may determine a second subset of the set of beams associated with the base station 105-e. The base station 105-e may use the second subset of the set of beams, determined based on the sensor measurements obtained by sensors associated with the base station 105-e, as opposed to the first subset of beams associated with the received provisioned route beam list.

At 525, the base station 105-e may deactivate a second subset of beams. For example, the second subset of the set of beams associated with the base station 105-e may include beams that were not on the list of communication beams received from the base station 105-d. That is, the base station 105-e may deactivate the beams not included in the first subset of the set of beams associated with the base station 105-e and indicated in the provisioned route beam list.

At 530, in some cases, the base station 105-e may perform a beam sweeping procedure using the subset of the set of communication beams indicated by the base station 105-d (e.g., in the provisioned route beam list). In some other cases, the base station 105-e may perform the beam sweeping procedure using a second subset of the set of communication beams determined based on sensor measurements obtained at the base station 105-e and the provisioned route beam list.

At 535, the base station 105-e may select a beam for communication with the UE 115-b from the subset of the set of communication beams and based on the results of the beams sweeping procedure.

At 540, the base station 105-e may communicate with the UE 115-b using the selected beam from the subset of the set of communication beams.

Figure 6:
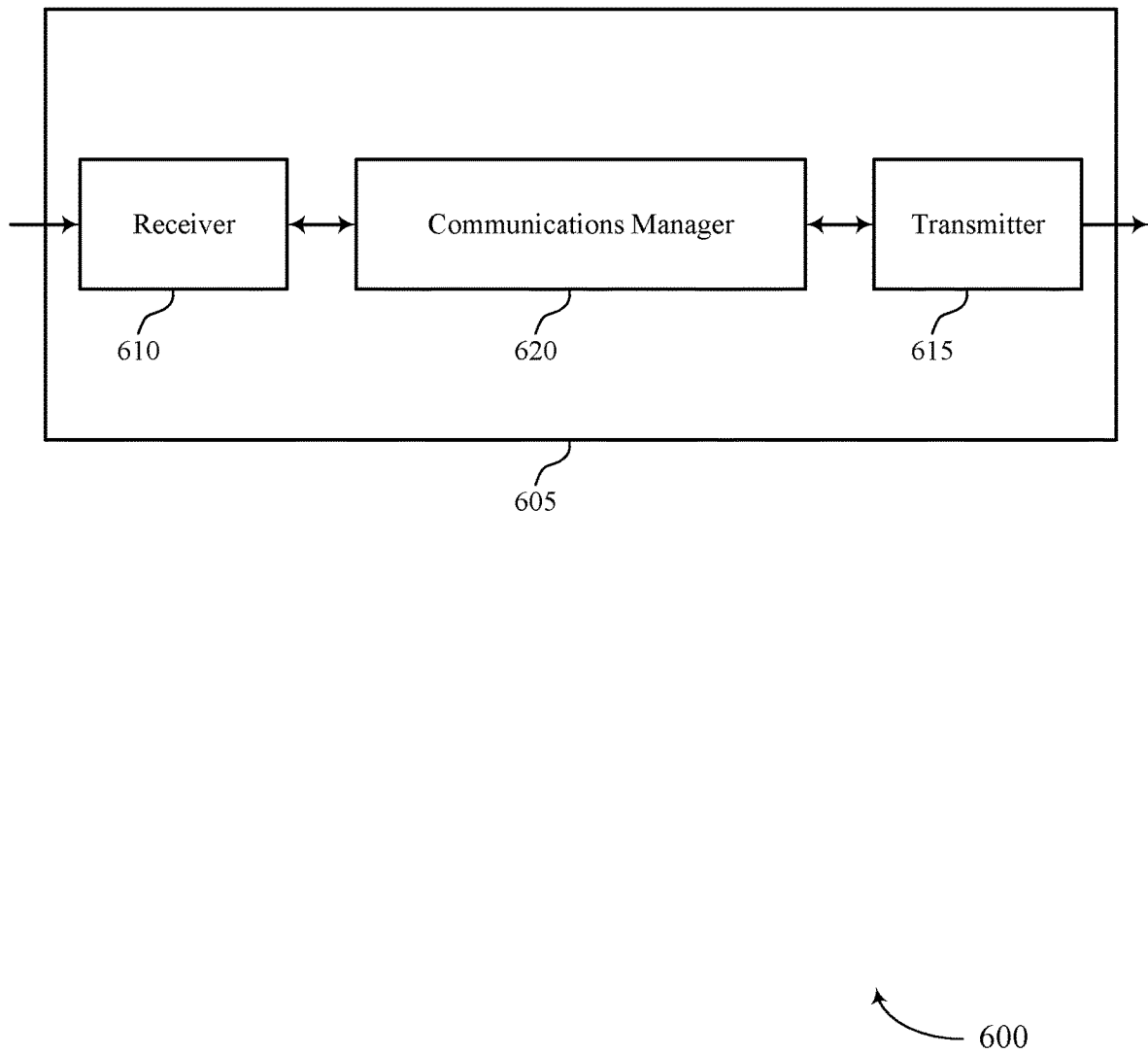
FIGS. 6 and 7 show block diagrams of devices that support sensor-based determination of a provisioned route beam list in accordance with aspects of the present disclosure.

FIG. 6 shows a block diagram 600 of a device 605 that supports sensor-based determination of a provisioned route beam list in accordance with aspects of the present disclosure. The device 605 may be an example of aspects of a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to sensor-based determination of a provisioned route beam list). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to sensor-based determination of a provisioned route beam list). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of sensor-based determination of a provisioned route beam list as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first base station in accordance with examples as disclosed herein. For example, the communications manager 620 may be configured as or otherwise support a means for obtaining a sensor measurement using one or more sensors at the first base station. The communications manager 620 may be configured as or otherwise support a means for generating a list of communication beams associated with a cell based on the sensor measurement, the cell being configured with a set of communication beams and the list of communication beams indicating a subset of the set of communication beams for the cell. The communications manager 620 may be configured as or otherwise support a means for transmitting, to a second base station serving the cell, a message including the list of communication beams and a cell identifier for the cell.

Additionally or alternatively, the communications manager 620 may support wireless communications at a first base station in accordance with examples as disclosed herein. For example, the communications manager 620 may be configured as or otherwise support a means for serving a cell using a set of communication beams configured at the first base station. The communications manager 620 may be configured as or otherwise support a means for receiving, from a second base station, a message including a list of communication beams and a cell identifier for the cell, the list of communication beams indicating a subset of the set of communication beams for the cell. The communications manager 620 may be configured as or otherwise support a means for communicating with a UE using the subset of the set of communication beams based on the message including the list of communication beams.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reducing processing overhead associated with determining beams for communication (e.g., during a handover process). For example, a base station may predict a route of a UE and may provision one or more neighboring base stations with subsets of communication beams to use for communications with the UE. Reducing the number of beams to use for beamforming operations at one or more neighboring base stations may reduce the processing overhead and latency associated with beamforming operations at the one or more neighboring base stations.

Figure 7:
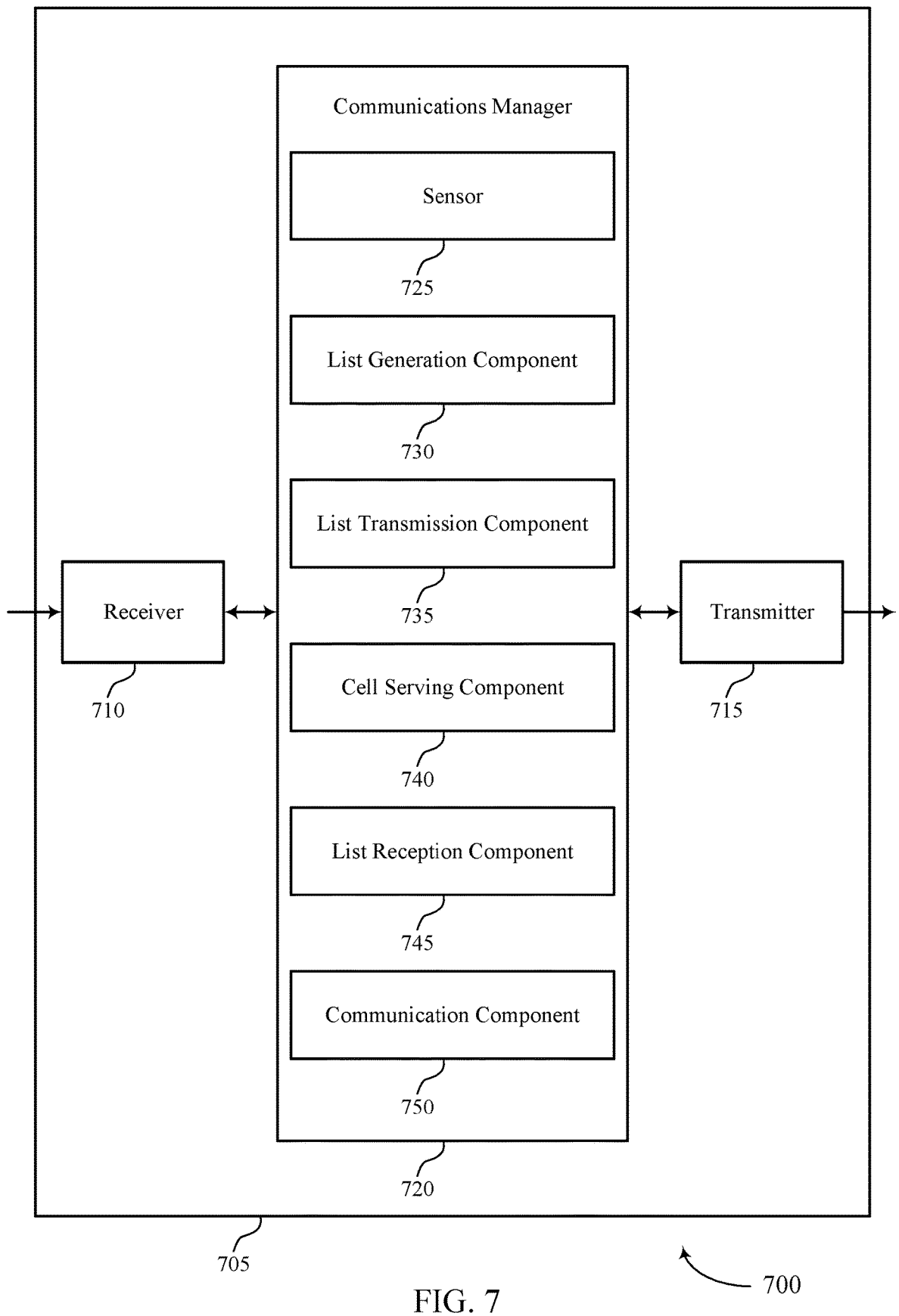

FIG. 7 shows a block diagram 700 of a device 705 that supports sensor-based determination of a provisioned route beam list in accordance with aspects of the present disclosure. The device 705 may be an example of aspects of a device 605 or a base station 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to sensor-based determination of a provisioned route beam list). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to sensor-based determination of a provisioned route beam list). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of sensor-based determination of a provisioned route beam list as described herein. For example, the communications manager 720 may include a sensor 725, a list generation component 730, a list transmission component 735, a cell serving component 740, a list reception component 745, a communication component 750, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first base station in accordance with examples as disclosed herein. The sensor 725 may be configured as or otherwise support a means for obtaining a sensor measurement (e.g., using one or more sensors) at the first base station. The list generation component 730 may be configured as or otherwise support a means for generating a list of communication beams associated with a cell based on the sensor measurement, the cell being configured with a set of communication beams and the list of communication beams indicating a subset of the set of communication beams for the cell. The list transmission component 735 may be configured as or otherwise support a means for transmitting, to a second base station serving the cell, a message including the list of communication beams and a cell identifier for the cell.

Additionally or alternatively, the communications manager 720 may support wireless communications at a first base station in accordance with examples as disclosed herein. The cell serving component 740 may be configured as or otherwise support a means for serving a cell using a set of communication beams configured at the first base station. The list reception component 745 may be configured as or otherwise support a means for receiving, from a second base station, a message including a list of communication beams and a cell identifier for the cell, the list of communication beams indicating a subset of the set of communication beams for the cell. The communication component 750 may be configured as or otherwise support a means for communicating with a UE using the subset of the set of communication beams based on the message including the list of communication beams.

Figure 8:
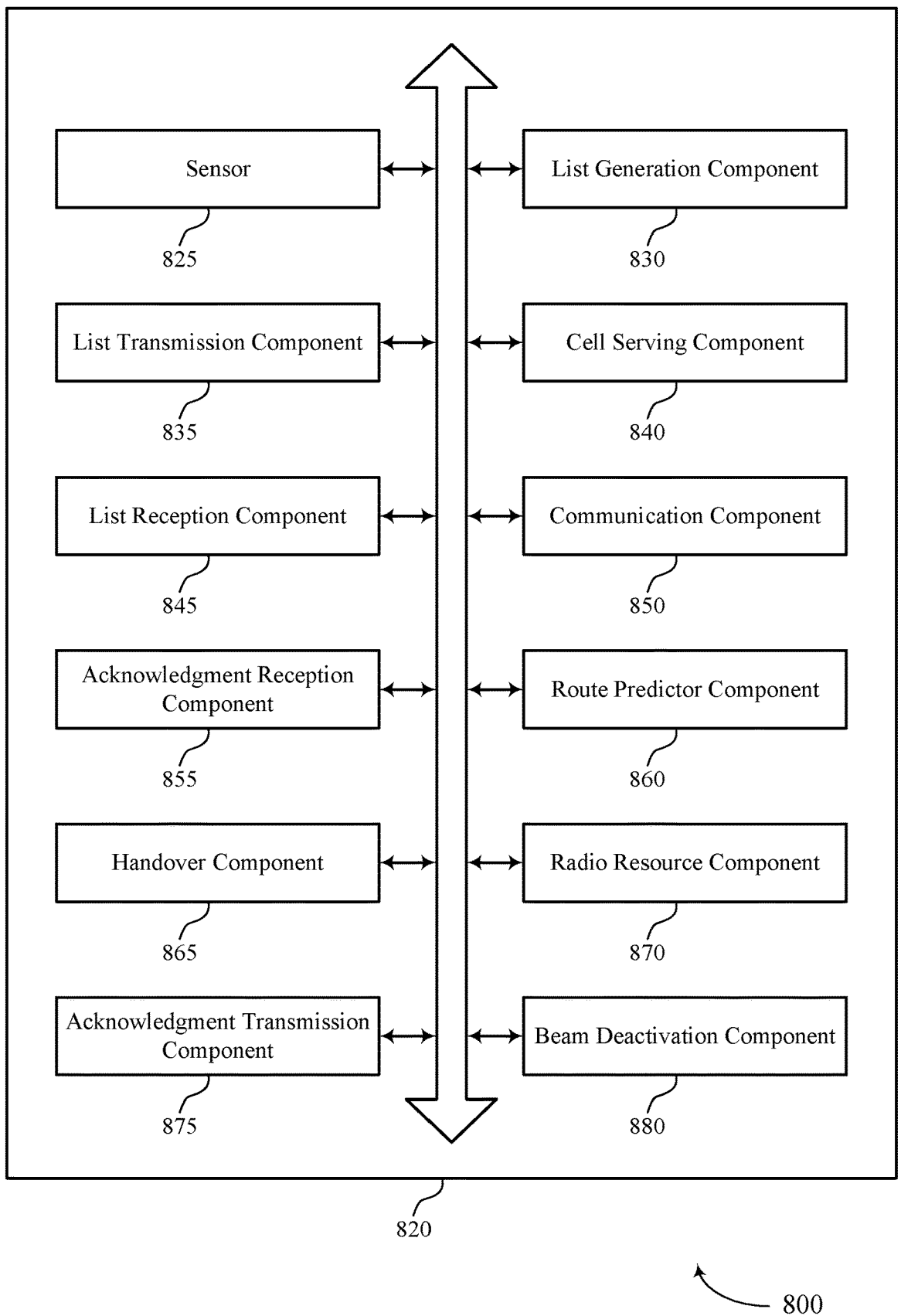
FIG. 8 shows a block diagram of a communications manager that supports sensor-based determination of a provisioned route beam list in accordance with aspects of the present disclosure.

FIG. 8 shows a block diagram 800 of a communications manager 820 that supports sensor-based determination of a provisioned route beam list in accordance with aspects of the present disclosure. The communications manager 820 may be an example of aspects of a communications manager 620, a communications manager 720, or both, as described herein. The communications manager 820, or various components thereof, may be an example of means for performing various aspects of sensor-based determination of a provisioned route beam list as described herein. For example, the communications manager 820 may include a sensor 825, a list generation component 830, a list transmission component 835, a cell serving component 840, a list reception component 845, a communication component 850, an acknowledgment reception component 855, a route predictor component 860, a handover component 865, a radio resource component 870, an acknowledgment transmission component 875, a beam deactivation component 880, or any combination thereof. Each of these components may communicate, directly or indirectly, with one another (e.g., via one or more buses).

The communications manager 820 may support wireless communications at a first base station in accordance with examples as disclosed herein. The sensor 825 may be configured as or otherwise support a means for obtaining a sensor measurement using one or more sensors at the first base station. The list generation component 830 may be configured as or otherwise support a means for generating a list of communication beams associated with a cell based on the sensor measurement, the cell being configured with a set of communication beams and the list of communication beams indicating a subset of the set of communication beams for the cell. The list transmission component 835 may be configured as or otherwise support a means for transmitting, to a second base station serving the cell, a message including the list of communication beams and a cell identifier for the cell.

In some examples, the acknowledgment reception component 855 may be configured as or otherwise support a means for receiving, from the second base station and in response to the message including the list of communication beams, a second message including an acknowledgment for the list of communication beams.

In some examples, the route predictor component 860 may be configured as or otherwise support a means for predicting a route for a UE based on the sensor measurement, where the list of communication beams associated with the cell is generated based on the predicted route for the UE.

In some examples, the list generation component 830 may be configured as or otherwise support a means for generating a second list of communication beams associated with a second cell based on the sensor measurement, the second cell being configured with a second set of communication beams and the second list of communication beams indicating a second subset of the second set of communication beams for the second cell, where the message further includes the second list of communication beams and a second cell identifier for the second cell and is further transmitted to a third base station serving the second cell.

In some examples, the list generation component 830 may be configured as or otherwise support a means for generating a second list of communication beams associated with a second cell based on the sensor measurement, the second cell being configured with a second set of communication beams and the second list of communication beams indicating a second subset of the second set of communication beams for the second cell. In some examples, the list transmission component 835 may be configured as or otherwise support a means for transmitting, to a third base station serving the second cell, a second message including the second list of communication beams and a second cell identifier for the second cell.

In some examples, the handover component 865 may be configured as or otherwise support a means for triggering handover of a UE on the cell, where the message including the list of communication beams is transmitted to the second base station based on the triggered handover of the UE. In some examples, the message including the list of communication beams further includes an identifier of the UE.

In some examples, the radio resource component 870 may be configured as or otherwise support a means for updating RRM information for the cell based on the sensor measurement, where the message including the list of communication beams is transmitted to the second base station based on the updated RRM information for the cell.

In some examples, to support generating the list of communication beams associated with the cell, the list generation component 830 may be configured as or otherwise support a means for determining the subset of the set of communication beams for the cell based on one or more sensor measurements including the sensor measurement, mobility information for a UE, historical beam usage information, historical UE mobility information, a location of the cell, a range of the cell, one or more interfering objects associated with the cell, beam coverage information for the cell, a machine learning algorithm, or a combination thereof.

In some examples, the one or more sensors include a camera assistance sensor, a radar support sensor, a positioning system sensor, or a combination thereof. In some examples, the message is transmitted to the second base station via an Xn interface.

Additionally or alternatively, the communications manager 820 may support wireless communications at a first base station in accordance with examples as disclosed herein. The cell serving component 840 may be configured as or otherwise support a means for serving a cell using a set of communication beams configured at the first base station. The list reception component 845 may be configured as or otherwise support a means for receiving, from a second base station, a message including a list of communication beams and a cell identifier for the cell, the list of communication beams indicating a subset of the set of communication beams for the cell. The communication component 850 may be configured as or otherwise support a means for communicating with a UE using the subset of the set of communication beams based on the message including the list of communication beams.

In some examples, the acknowledgment transmission component 875 may be configured as or otherwise support a means for transmitting, to the second base station and in response to the message including the list of communication beams, a second message including an acknowledgment for the list of communication beams.

In some examples, the beam deactivation component 880 may be configured as or otherwise support a means for deactivating a second subset of the set of communication beams based on the list of communication beams, the second subset of the set of communication beams being distinct from the subset of the set of communication beams indicated by the list of communication beams.

In some examples, to support communicating with the UE using the subset of the set of communication beams, the communication component 850 may be configured as or otherwise support a means for performing a beam sweeping procedure using the subset of the set of communication beams. In some examples, to support communicating with the UE using the subset of the set of communication beams, the communication component 850 may be configured as or otherwise support a means for selecting a communication beam of the subset of the set of communication beams to communicate with the UE based on the beam sweeping procedure.

In some examples, the handover component 865 may be configured as or otherwise support a means for receiving, from the second base station, an indication to handover the UE on the cell, where the message including the list of communication beams is received based on the indication to handover the UE on the cell. In some examples, the message including the list of communication beams further includes an identifier of the UE.

In some examples, the message including the list of communication beams updates RRM information for the cell.

In some examples, the sensor 825 may be configured as or otherwise support a means for obtaining a sensor measurement using one or more sensors at the first base station. In some examples, the list generation component 830 may be configured as or otherwise support a means for determining a second subset of the set of communication beams based on the sensor measurement and the message including the list of communication beams. In some examples, to support communicating with the UE, the communication component 850 may be configured as or otherwise support a means for communicating with the UE using the determined second subset of the set of communication beams, the second subset of the set of communication beams including the subset of the set of communication beams.

In some examples, the message is received from the second base station via an Xn interface.

Figure 9:
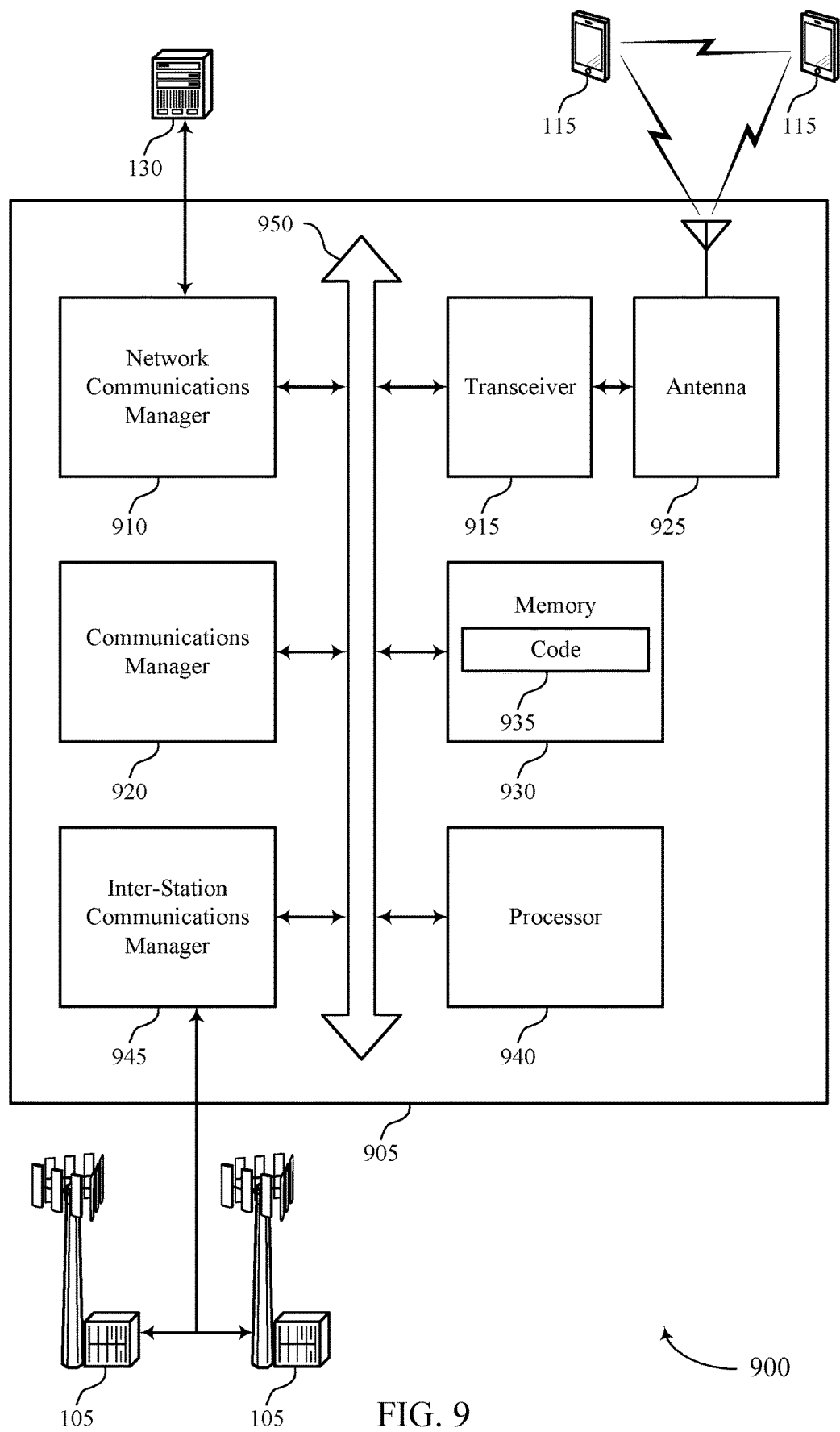
FIG. 9 shows a diagram of a system including a device that supports sensor-based determination of a provisioned route beam list in accordance with aspects of the present disclosure.

FIG. 9 shows a diagram of a system 900 including a device 905 that supports sensor-based determination of a provisioned route beam list in accordance with aspects of the present disclosure. The device 905 may be an example of or include the components of a device 605, a device 705, or a base station 105 as described herein. The device 905 may communicate wirelessly with one or more base stations 105, UEs 115, or any combination thereof. The device 905 may include components for bi-directional voice and data communications including components for transmitting and receiving communications, such as a communications manager 920, a network communications manager 910, a transceiver 915, an antenna 925, a memory 930, code 935, a processor 940, and an inter-station communications manager 945. These components may be in electronic communication or otherwise coupled (e.g., operatively, communicatively, functionally, electronically, electrically) via one or more buses (e.g., a bus 950).

The network communications manager 910 may manage communications with a core network 130 (e.g., via one or more wired backhaul links). For example, the network communications manager 910 may manage the transfer of data communications for client devices, such as one or more UEs 115.

In some cases, the device 905 may include a single antenna 925. However, in some other cases the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic input/output system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting sensor-based determination of a provisioned route beam list). For example, the device 905 or a component of the device 905 may include a processor 940 and memory 930 coupled to the processor 940, the processor 940 and memory 930 configured to perform various functions described herein.

The inter-station communications manager 945 may manage communications with other base stations 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communications network technology to provide communication between base stations 105.

The communications manager 920 may support wireless communications at a first base station in accordance with examples as disclosed herein. For example, the communications manager 920 may be configured as or otherwise support a means for obtaining a sensor measurement using one or more sensors at the first base station. The communications manager 920 may be configured as or otherwise support a means for generating a list of communication beams associated with a cell based on the sensor measurement, the cell being configured with a set of communication beams and the list of communication beams indicating a subset of the set of communication beams for the cell. The communications manager 920 may be configured as or otherwise support a means for transmitting, to a second base station serving the cell, a message including the list of communication beams and a cell identifier for the cell.

Additionally or alternatively, the communications manager 920 may support wireless communications at a first base station in accordance with examples as disclosed herein. For example, the communications manager 920 may be configured as or otherwise support a means for serving a cell using a set of communication beams configured at the first base station. The communications manager 920 may be configured as or otherwise support a means for receiving, from a second base station, a message including a list of communication beams and a cell identifier for the cell, the list of communication beams indicating a subset of the set of communication beams for the cell. The communications manager 920 may be configured as or otherwise support a means for communicating with a UE using the subset of the set of communication beams based on the message including the list of communication beams.

By including or configuring the communications manager 920 in accordance with examples as described herein, the device 905 may support techniques for reduced latency, reduced power consumption, reduced inter-cell interference, and improved coordination between base stations within a wireless network.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of sensor-based determination of a provisioned route beam list as described herein, or the processor 940 and the memory 930 may be otherwise configured to perform or support such operations.

Figure 10:
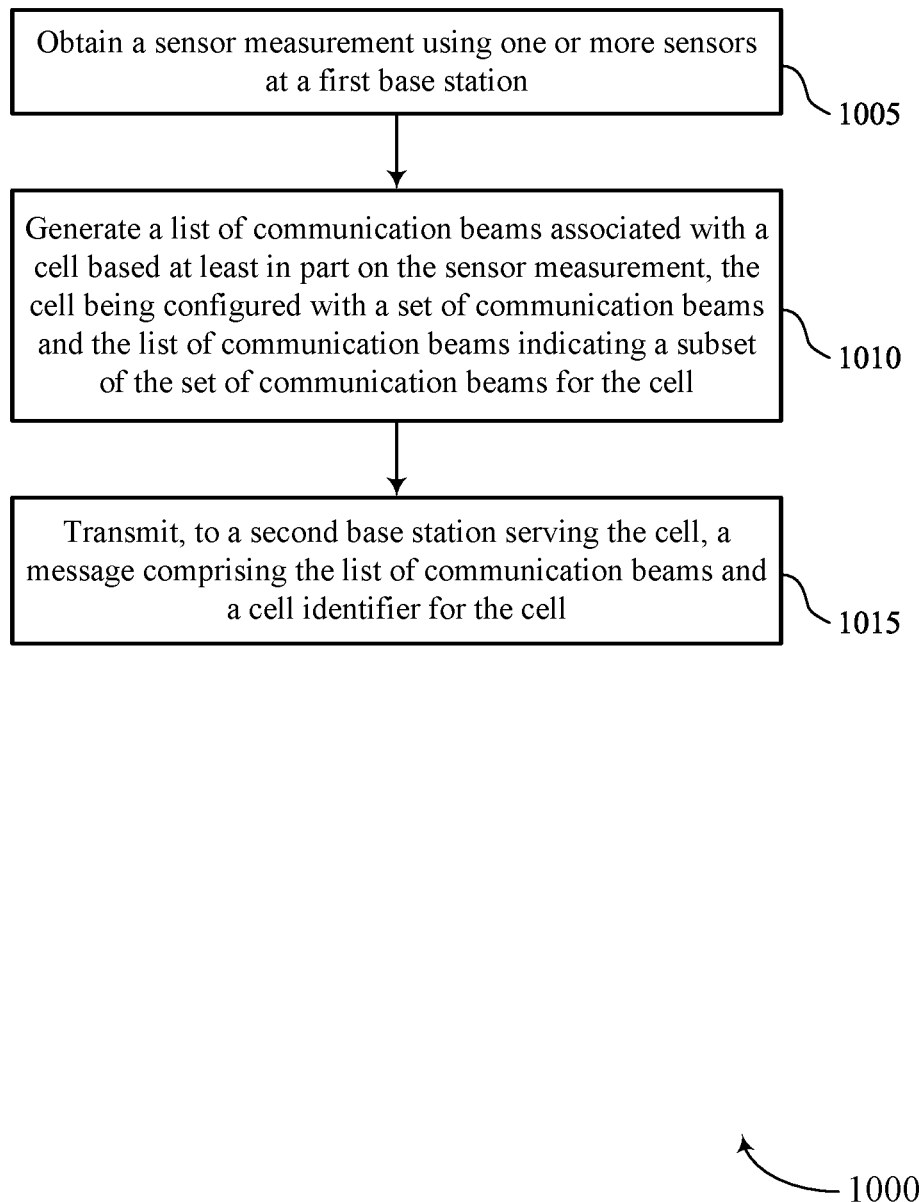
FIGS. 10 through 15 show flowcharts illustrating methods that support sensor-based determination of a provisioned route beam list in accordance with aspects of the present disclosure.

FIG. 10 shows a flowchart illustrating a method 1000 that supports sensor-based determination of a provisioned route beam list in accordance with aspects of the present disclosure. The operations of the method 1000 may be implemented by a base station (e.g., a first base station) or its components as described herein. For example, the operations of the method 1000 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1005, the method may include obtaining a sensor measurement using one or more sensors at the first base station. The operations of 1005 may be performed in accordance with examples as disclosed herein. In some examples, aspects of the operations of 1005 may be performed by a sensor 825 as described with reference to FIG. 8.

At 1010, the method may include generating a list of communication beams associated with a cell based on the sensor measurement, the cell being configured with a set of communication beams and the list of communication beams indicating a subset of the set of communication beams for the cell. The operations of 1010 may be performed in accordance with examples as disclosed herein. In some examples, aspects of the operations of 1010 may be performed by a list generation component 830 as described with reference to FIG. 8.

At 1015, the method may include transmitting, to a second base station serving the cell, a message including the list of communication beams and a cell identifier for the cell. The operations of 1015 may be performed in accordance with examples as disclosed herein. In some examples, aspects of the operations of 1015 may be performed by a list transmission component 835 as described with reference to FIG. 8.

Figure 11:
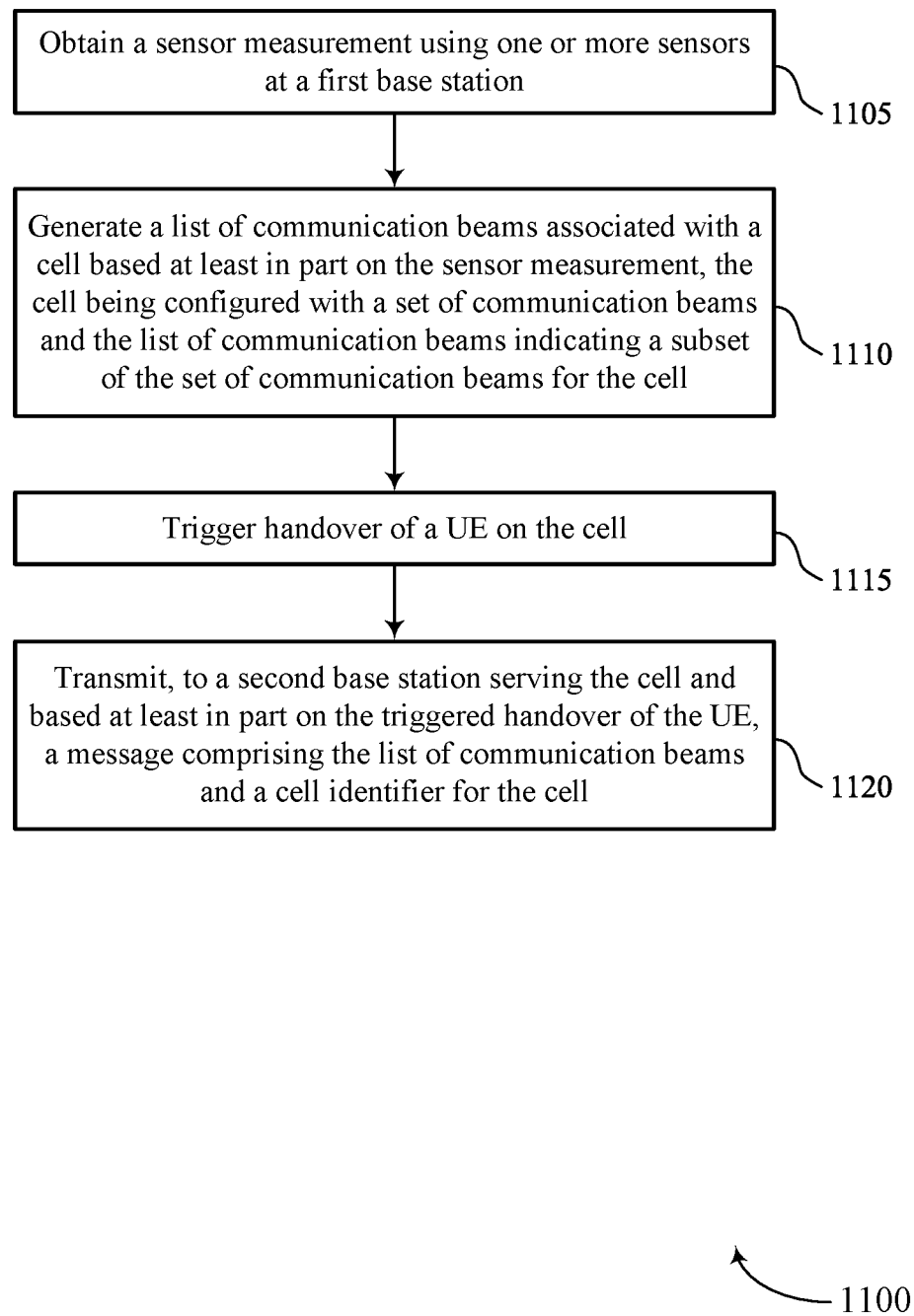

FIG. 11 shows a flowchart illustrating a method 1100 that supports sensor-based determination of a provisioned route beam list in accordance with aspects of the present disclosure. The operations of the method 1100 may be implemented by a base station (e.g., a first base station) or its components as described herein. For example, the operations of the method 1100 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1105, the method may include obtaining a sensor measurement using one or more sensors at the first base station. The operations of 1105 may be performed in accordance with examples as disclosed herein. In some examples, aspects of the operations of 1105 may be performed by a sensor 825 as described with reference to FIG. 8.

At 1110, the method may include generating a list of communication beams associated with a cell based on the sensor measurement, the cell being configured with a set of communication beams and the list of communication beams indicating a subset of the set of communication beams for the cell. The operations of 1110 may be performed in accordance with examples as disclosed herein. In some examples, aspects of the operations of 1110 may be performed by a list generation component 830 as described with reference to FIG. 8.

At 1115, the method may include triggering handover of a UE on the cell. The operations of 1115 may be performed in accordance with examples as disclosed herein. In some examples, aspects of the operations of 1115 may be performed by a handover component 865 as described with reference to FIG. 8.

At 1120, the method may include transmitting, to a second base station serving the cell and based on the triggered handover of the UE, a message including the list of communication beams and a cell identifier for the cell. The operations of 1120 may be performed in accordance with examples as disclosed herein. In some examples, aspects of the operations of 1120 may be performed by a list transmission component 835 as described with reference to FIG. 8.

Figure 12:
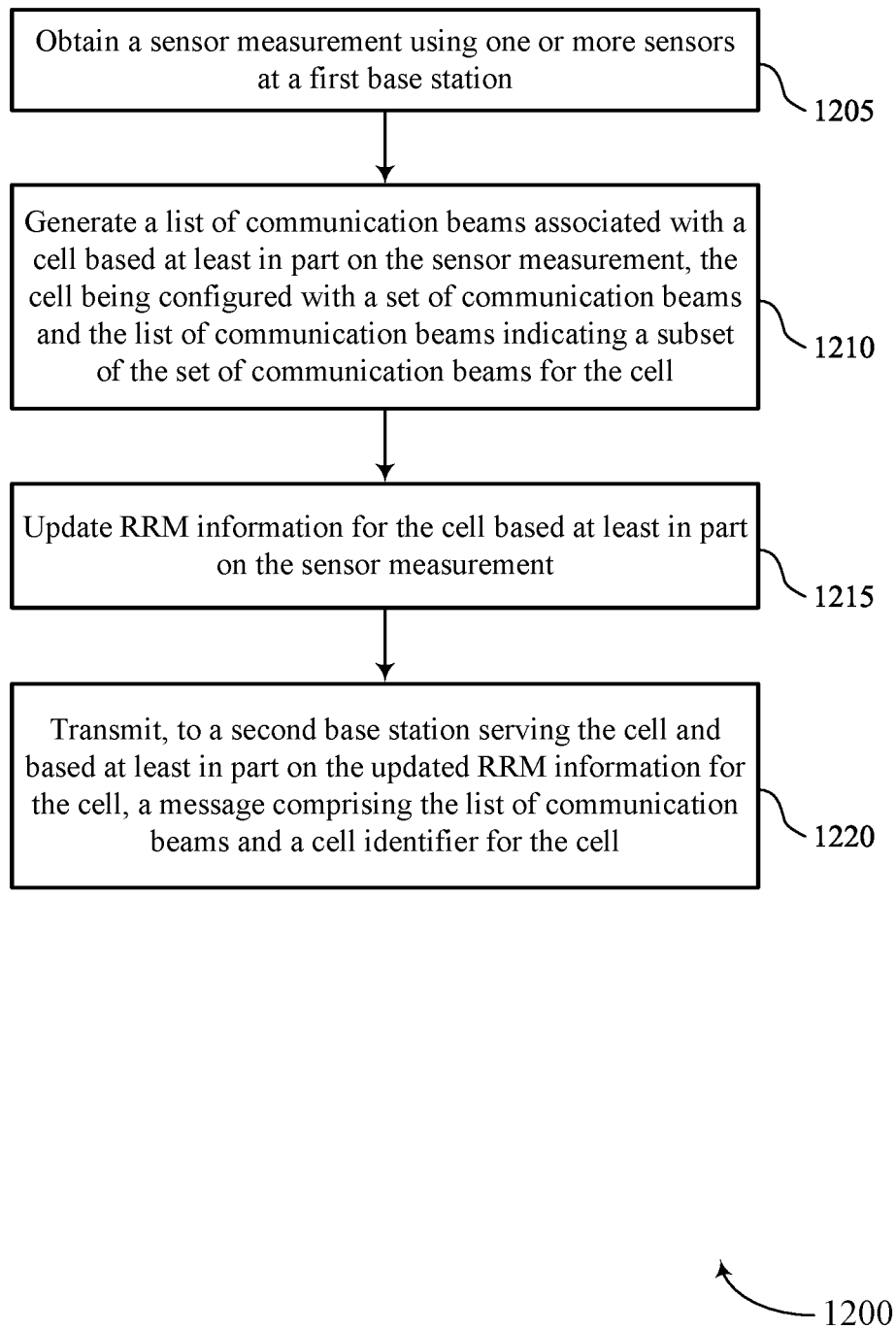

FIG. 12 shows a flowchart illustrating a method 1200 that supports sensor-based determination of a provisioned route beam list in accordance with aspects of the present disclosure. The operations of the method 1200 may be implemented by a base station (e.g., a first base station) or its components as described herein. For example, the operations of the method 1200 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1205, the method may include obtaining a sensor measurement using one or more sensors at the first base station. The operations of 1205 may be performed in accordance with examples as disclosed herein. In some examples, aspects of the operations of 1205 may be performed by a sensor 825 as described with reference to FIG. 8.

At 1210, the method may include generating a list of communication beams associated with a cell based on the sensor measurement, the cell being configured with a set of communication beams and the list of communication beams indicating a subset of the set of communication beams for the cell. The operations of 1210 may be performed in accordance with examples as disclosed herein. In some examples, aspects of the operations of 1210 may be performed by a list generation component 830 as described with reference to FIG. 8.

At 1215, the method may include updating RRM information for the cell based on the sensor measurement. The operations of 1215 may be performed in accordance with examples as disclosed herein. In some examples, aspects of the operations of 1215 may be performed by a radio resource component 870 as described with reference to FIG. 8.

At 1220, the method may include transmitting, to a second base station serving the cell and based on the updated RRM information for the cell, a message including the list of communication beams and a cell identifier for the cell. The operations of 1220 may be performed in accordance with examples as disclosed herein. In some examples, aspects of the operations of 1220 may be performed by a list transmission component 835 as described with reference to FIG. 8.

Figure 13:
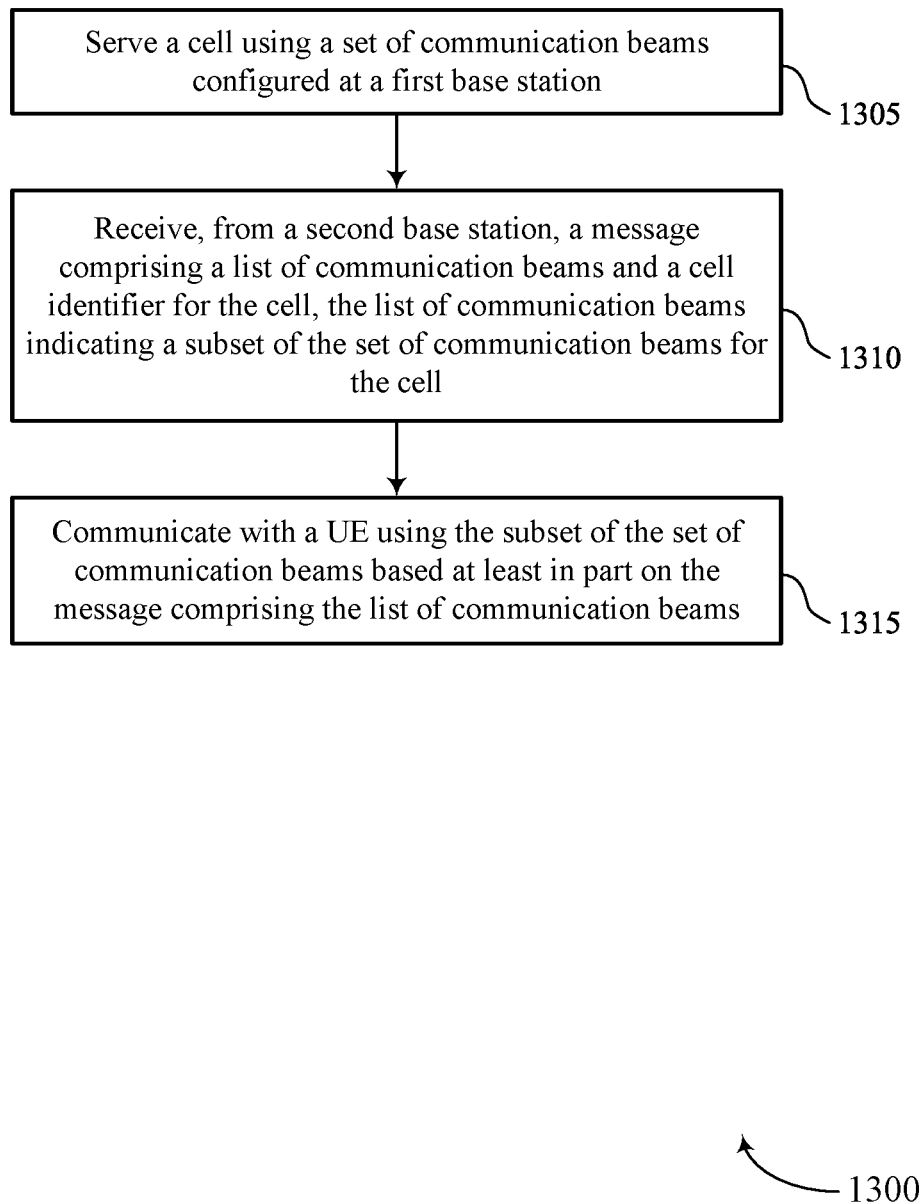

FIG. 13 shows a flowchart illustrating a method 1300 that supports sensor-based determination of a provisioned route beam list in accordance with aspects of the present disclosure. The operations of the method 1300 may be implemented by a base station (e.g., a first base station) or its components as described herein. For example, the operations of the method 1300 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1305, the method may include serving a cell using a set of communication beams configured at the first base station. The operations of 1305 may be performed in accordance with examples as disclosed herein. In some examples, aspects of the operations of 1305 may be performed by a cell serving component 840 as described with reference to FIG. 8.

At 1310, the method may include receiving, from a second base station, a message including a list of communication beams and a cell identifier for the cell, the list of communication beams indicating a subset of the set of communication beams for the cell. The operations of 1310 may be performed in accordance with examples as disclosed herein. In some examples, aspects of the operations of 1310 may be performed by a list reception component 845 as described with reference to FIG. 8.

At 1315, the method may include communicating with a UE using the subset of the set of communication beams based on the message including the list of communication beams. The operations of 1315 may be performed in accordance with examples as disclosed herein. In some examples, aspects of the operations of 1315 may be performed by a communication component 850 as described with reference to FIG. 8.

Figure 14:
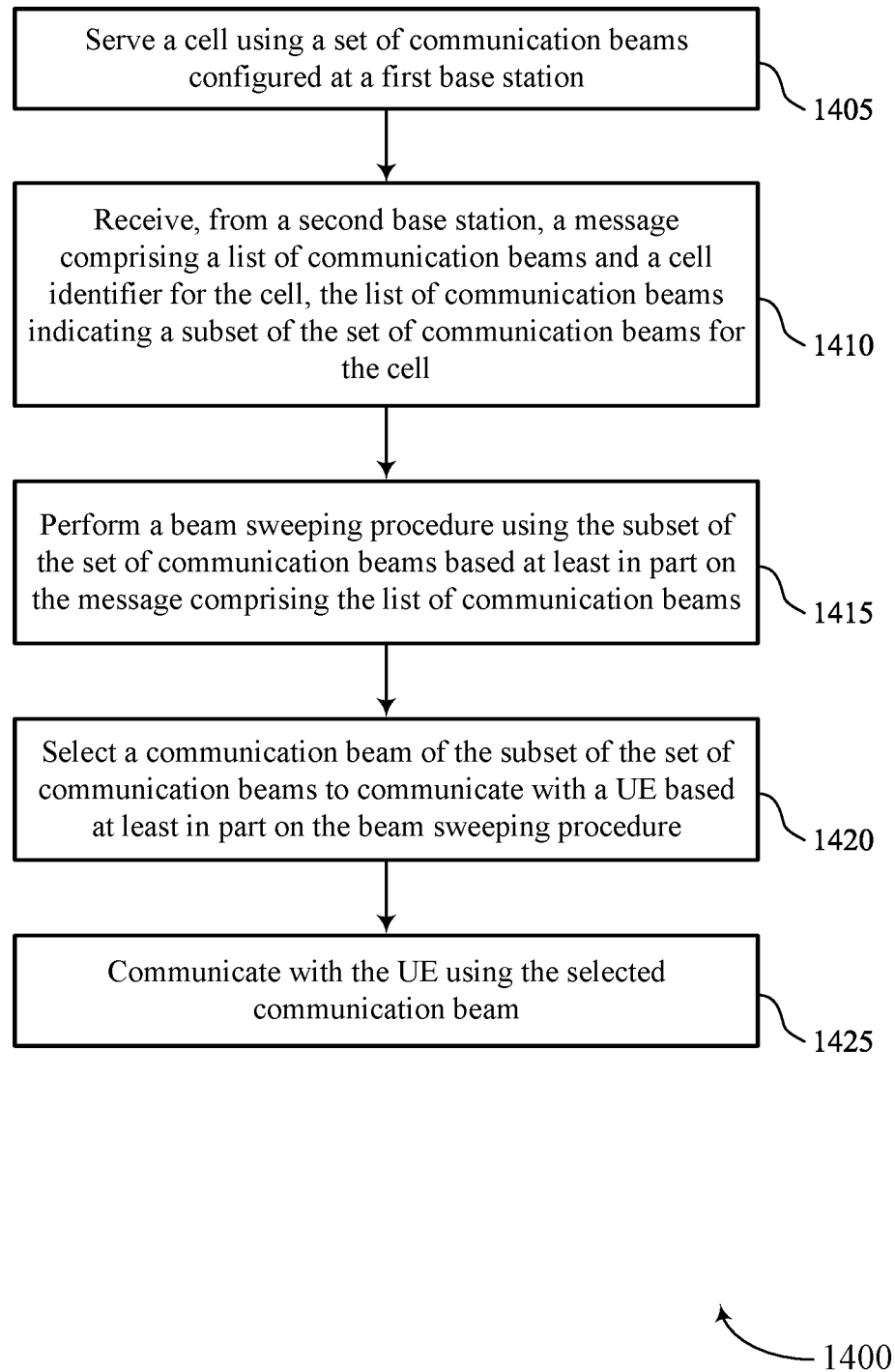

FIG. 14 shows a flowchart illustrating a method 1400 that supports sensor-based determination of a provisioned route beam list in accordance with aspects of the present disclosure. The operations of the method 1400 may be implemented by a base station (e.g., a first base station) or its components as described herein. For example, the operations of the method 1400 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1405, the method may include serving a cell using a set of communication beams configured at the first base station.

The operations of 1405 may be performed in accordance with examples as disclosed herein. In some examples, aspects of the operations of 1405 may be performed by a cell serving component 840 as described with reference to FIG. 8.

At 1410, the method may include receiving, from a second base station, a message including a list of communication beams and a cell identifier for the cell, the list of communication beams indicating a subset of the set of communication beams for the cell. The operations of 1410 may be performed in accordance with examples as disclosed herein. In some examples, aspects of the operations of 1410 may be performed by a list reception component 845 as described with reference to FIG. 8.

At 1415, the method may include performing a beam sweeping procedure using the subset of the set of communication beams based on the message including the list of communication beams. The operations of 1415 may be performed in accordance with examples as disclosed herein. In some examples, aspects of the operations of 1415 may be performed by a communication component 850 as described with reference to FIG. 8.

At 1420, the method may include selecting a communication beam of the subset of the set of communication beams to communicate with a UE based on the beam sweeping procedure. The operations of 1420 may be performed in accordance with examples as disclosed herein. In some examples, aspects of the operations of 1420 may be performed by a communication component 850 as described with reference to FIG. 8.

At 1425, the method may include communicating with the UE using the selected communication beam. The operations of 1425 may be performed in accordance with examples as disclosed herein. In some examples, aspects of the operations of 1425 may be performed by a communication component 850 as described with reference to FIG. 8.

Figure 15:
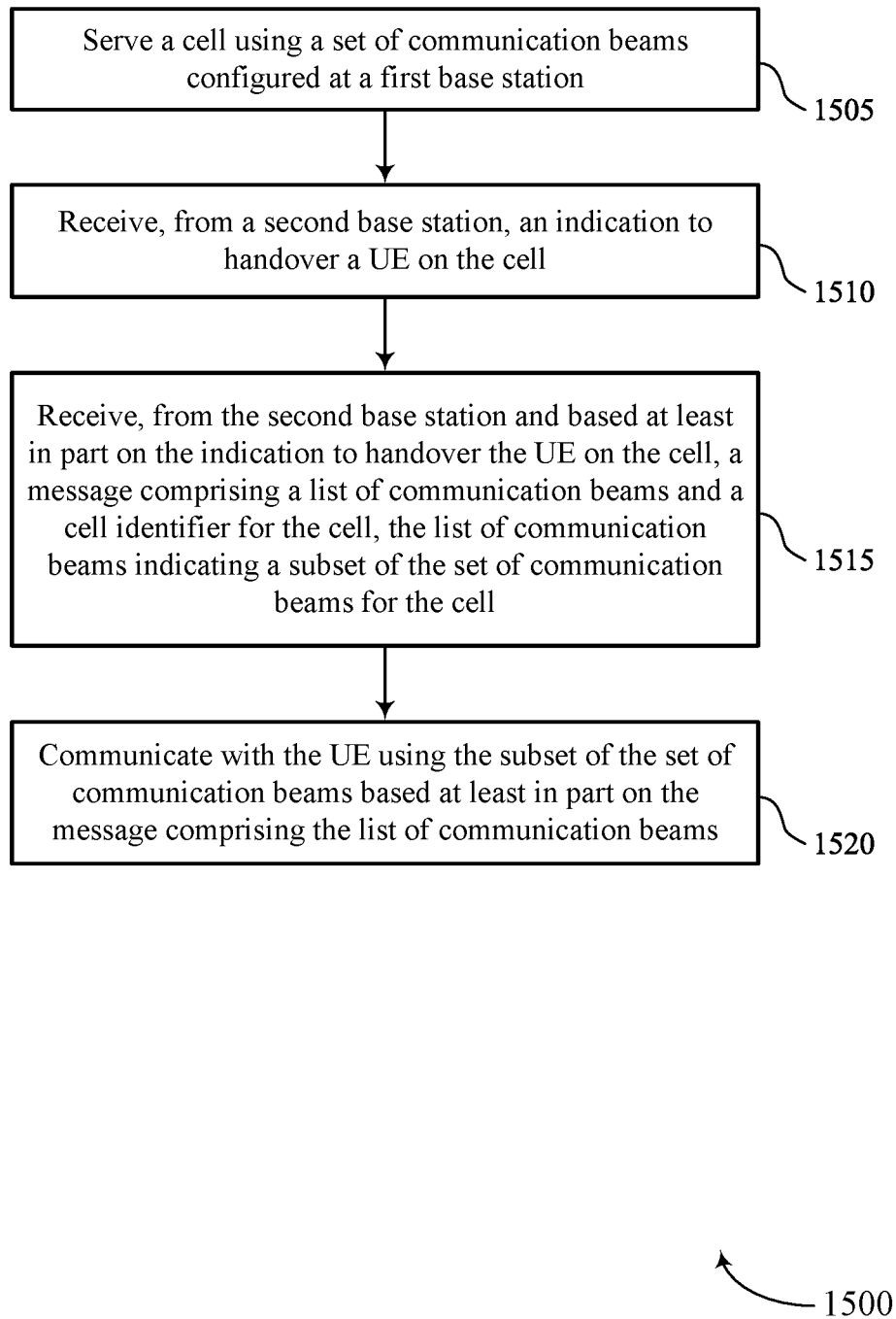

FIG. 15 shows a flowchart illustrating a method 1500 that supports sensor-based determination of a provisioned route beam list in accordance with aspects of the present disclosure. The operations of the method 1500 may be implemented by a base station (e.g., a first base station) or its components as described herein. For example, the operations of the method 1500 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1505, the method may include serving a cell using a set of communication beams configured at the first base station. The operations of 1505 may be performed in accordance with examples as disclosed herein. In some examples, aspects of the operations of 1505 may be performed by a cell serving component 840 as described with reference to FIG. 8.

At 1510, the method may include receiving, from a second base station, an indication to handover the UE on the cell. The operations of 1510 may be performed in accordance with examples as disclosed herein. In some examples, aspects of the operations of 1510 may be performed by a handover component 865 as described with reference to FIG. 8.

At 1515, the method may include receiving, from the second base station and based on the indication to handover the UE on the cell, a message including a list of communication beams and a cell identifier for the cell, the list of communication beams indicating a subset of the set of communication beams for the cell. The operations of 1515 may be performed in accordance with examples as disclosed herein. In some examples, aspects of the operations of 1515 may be performed by a list reception component 845 as described with reference to FIG. 8.

At 1520, the method may include communicating with a UE using the subset of the set of communication beams based on the message including the list of communication beams. The operations of 1520 may be performed in accordance with examples as disclosed herein. In some examples, aspects of the operations of 1520 may be performed by a communication component 850 as described with reference to FIG. 8.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a first base station, comprising: obtaining a sensor measurement using one or more sensors at the first base station; generating a list of communication beams associated with a cell based at least in part on the sensor measurement, the cell being configured with a set of communication beams and the list of communication beams indicating a subset of the set of communication beams for the cell; and transmitting, to a second base station serving the cell, a message comprising the list of communication beams and a cell identifier for the cell.

Aspect 2: The method of aspect 1, further comprising: receiving, from the second base station and in response to the message comprising the list of communication beams, a second message comprising an acknowledgment for the list of communication beams.

Aspect 3: The method of any of aspects 1 through 2, further comprising: predicting a route for a UE based at least in part on the sensor measurement, wherein the list of communication beams associated with the cell is generated based at least in part on the predicted route for the UE.

Aspect 4: The method of any of aspects 1 through 3, further comprising: generating a second list of communication beams associated with a second cell based at least in part on the sensor measurement, the second cell being configured with a second set of communication beams and the second list of communication beams indicating a second subset of the second set of communication beams for the second cell, wherein the message further comprises the second list of communication beams and a second cell identifier for the second cell and is further transmitted to a third base station serving the second cell.

Aspect 5: The method of any of aspects 1 through 3, further comprising: generating a second list of communication beams associated with a second cell based at least in part on the sensor measurement, the second cell being configured with a second set of communication beams and the second list of communication beams indicating a second subset of the second set of communication beams for the second cell; and transmitting, to a third base station serving the second cell, a second message comprising the second list of communication beams and a second cell identifier for the second cell.

Aspect 6: The method of any of aspects 1 through 5, further comprising: triggering handover of a UE on the cell, wherein the message comprising the list of communication beams is transmitted to the second base station based at least in part on the triggered handover of the UE.

Aspect 7: The method of aspect 6, wherein the message comprising the list of communication beams further comprises an identifier of the UE.

Aspect 8: The method of any of aspects 1 through 5, further comprising: updating radio resource management information for the cell based at least in part on the sensor measurement, wherein the message comprising the list of communication beams is transmitted to the second base station based at least in part on the updated radio resource management information for the cell.

Aspect 9: The method of any of aspects 1 through 8, wherein generating the list of communication beams associated with the cell further comprises: determining the subset of the set of communication beams for the cell based at least in part on one or more sensor measurements comprising the sensor measurement, mobility information for a UE, historical beam usage information, historical UE mobility information, a location of the cell, a range of the cell, one or more interfering objects associated with the cell, beam coverage information for the cell, a machine learning algorithm, or a combination thereof.

Aspect 10: The method of any of aspects 1 through 9, wherein the one or more sensors comprise a camera assistance sensor, a radar support sensor, a positioning system sensor, or a combination thereof.

Aspect 11: The method of any of aspects 1 through 10, wherein the message is transmitted to the second base station via an Xn interface.

Aspect 12: A method for wireless communications at a first base station, comprising: serving a cell using a set of communication beams configured at the first base station; receiving, from a second base station, a message comprising a list of communication beams and a cell identifier for the cell, the list of communication beams indicating a subset of the set of communication beams for the cell; and communicating with a UE using the subset of the set of communication beams based at least in part on the message comprising the list of communication beams.

Aspect 13: The method of aspect 12, further comprising: transmitting, to the second base station and in response to the message comprising the list of communication beams, a second message comprising an acknowledgment for the list of communication beams.

Aspect 14: The method of any of aspects 12 through 13, further comprising: deactivating a second subset of the set of communication beams based at least in part on the list of communication beams, the second subset of the set of communication beams being distinct from the subset of the set of communications beams indicated by the list of communication beams.

Aspect 15: The method of any of aspects 12 through 14, wherein communicating with the UE using the subset of the set of communication beams comprises: performing a beam sweeping procedure using the subset of the set of communication beams; and selecting a communication beam of the subset of the set of communication beams to communicate with the UE based at least in part on the beam sweeping procedure.

Aspect 16: The method of any of aspects 12 through 15, further comprising: receiving, from the second base station, an indication to handover the UE on the cell, wherein the message comprising the list of communication beams is received based at least in part on the indication to handover the UE on the cell.

Aspect 17: The method of aspect 16, wherein the message comprising the list of communication beams further comprises an identifier of the UE.

Aspect 18: The method of any of aspects 12 through 15, wherein the message comprising the list of communication beams updates radio resource management information for the cell.

Aspect 19: The method of any of aspects 12 through 18, further comprising: obtaining a sensor measurement using one or more sensors at the first base station; and determining a second subset of the set of communication beams based at least in part on the sensor measurement and the message comprising the list of communication beams, wherein communicating with the UE comprises: communicating with the UE using the determined second subset of the set of communication beams, the second subset of the set of communication beams comprising the subset of the set of communication beams.

Aspect 20: The method of any of aspects 12 through 19, wherein the message is received from the second base station via an Xn interface.

Aspect 21: An apparatus for wireless communications at a first base station, comprising a processor; memory coupled with the processor; and instructions stored in the memory and executable by the processor to cause the apparatus to perform a method of any of aspects 1 through 11.

Aspect 22: An apparatus for wireless communications at a first base station, comprising at least one means for performing a method of any of aspects 1 through 11.

Aspect 23: A non-transitory computer-readable medium storing code for wireless communications at a first base station, the code comprising instructions executable by a processor to perform a method of any of aspects 1 through 11.

Aspect 24: An apparatus for wireless communications at a first base station, comprising a processor; memory coupled with the processor; and instructions stored in the memory and executable by the processor to cause the apparatus to perform a method of any of aspects 12 through 20.

Aspect 25: An apparatus for wireless communications at a first base station, comprising at least one means for performing a method of any of aspects 12 through 20.

Aspect 26: A non-transitory computer-readable medium storing code for wireless communications at a first base station, the code comprising instructions executable by a processor to perform a method of any of aspects 12 through 20.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first network device, comprising:
    obtaining a sensor measurement using one or more sensors at the first network device;
    predicting a route for a user equipment (UE) based at least in part on the sensor measurement;
    generating a list of communication beams associated with a cell based at least in part on the predicted route for the UE, the cell being configured with a set of communication beams and the list of communication beams indicating a subset of the set of communication beams for the cell; and
    transmitting, to a second network device serving the cell, a message comprising the list of communication beams, a cell identifier for the cell, and an identifier of the UE corresponding to the predicted route.

2. The method of claim 1, further comprising:
    receiving, from the second network device and in response to the message comprising the list of communication beams, a second message comprising an acknowledgment for the list of communication beams.

3. The method of claim 1, further comprising:
generating a second list of communication beams associated with a second cell based at least in part on the predicted route for the UE, the second cell being configured with a second set of communication beams and the second list of communication beams indicating a second subset of the second set of communication beams for the second cell, wherein the message further comprises the second list of communication beams and a second cell identifier for the second cell and is further transmitted to a third network device serving the second cell.

4. The method of claim 1, further comprising:
generating a second list of communication beams associated with a second cell based at least in part on the predicted route for the UE, the second cell being configured with a second set of communication beams and the second list of communication beams indicating a second subset of the second set of communication beams for the second cell; and
transmitting, to a third network device serving the second cell, a second message comprising the second list of communication beams and a second cell identifier for the second cell.

5. The method of claim 1, further comprising:
triggering handover of the UE on the cell, wherein the message comprising the list of communication beams is transmitted to the second network device based at least in part on the triggered handover of the UE.

6. The method of claim 1, further comprising:
updating radio resource management information for the cell based at least in part on the sensor measurement, wherein the message comprising the list of communication beams is transmitted to the second network device based at least in part on the updated radio resource management information for the cell.

7. The method of claim 1, wherein generating the list of communication beams associated with the cell further comprises:
determining the subset of the set of communication beams for the cell based at least in part on one or more sensor measurements comprising the sensor measurement, mobility information for the UE, historical beam usage information, historical UE mobility information, a location of the cell, a range of the cell, one or more interfering objects associated with the cell, beam coverage information for the cell, a machine learning algorithm, or a combination thereof.

8. The method of claim 1, wherein the one or more sensors comprise a camera assistance sensor, a radar support sensor, a positioning system sensor, or a combination thereof.

9. The method of claim 1, wherein the message is transmitted to the second network device via an Xn interface.

10. An apparatus for wireless communications at a first network device, comprising a processor, memory coupled with the processor, and instructions stored in the memory and executable by the processor to cause the apparatus to:
obtain a sensor measurement using one or more sensors at the first network device;
predict a route for a user equipment (UE) based at least in part on the sensor measurement;
generate a list of communication beams associated with a cell based at least in part on the predicted route for the UE, the cell being configured with a set of communication beams and the list of communication beams indicating a subset of the set of communication beams for the cell; and
transmit, to a second network device serving the cell, a message comprising the list of communication beams, a cell identifier for the cell, and an identifier of the UE corresponding to the predicted route.

11. The apparatus of claim 10, wherein the instructions are further executable by the processor to cause the apparatus to:
receive, from the second network device and in response to the message comprising the list of communication beams, a second message comprising an acknowledgment for the list of communication beams.

12. The apparatus of claim 10, wherein the instructions are further executable by the processor to cause the apparatus to:
generate a second list of communication beams associated with a second cell based at least in part on the predicted route for the UE, the second cell being configured with a second set of communication beams and the second list of communication beams indicating a second subset of the second set of communication beams for the second cell, wherein the message further comprises the second list of communication beams and a second cell identifier for the second cell and is further transmitted to a third network device serving the second cell.

13. The apparatus of claim 10, wherein the instructions are further executable by the processor to cause the apparatus to:
generate a second list of communication beams associated with a second cell based at least in part on the predicted route for the UE, the second cell being configured with a second set of communication beams and the second list of communication beams indicating a second subset of the second set of communication beams for the second cell; and
transmit, to a third network device serving the second cell, a second message comprising the second list of communication beams and a second cell identifier for the second cell.

14. The apparatus of claim 10, wherein the instructions are further executable by the processor to cause the apparatus to:
trigger handover of the UE on the cell, wherein the message comprising the list of communication beams is transmitted to the second network device based at least in part on the triggered handover of the UE.

15. The apparatus of claim 10, wherein the instructions are further executable by the processor to cause the apparatus to:
update radio resource management information for the cell based at least in part on the sensor measurement, wherein the message comprising the list of communication beams is transmitted to the second network device based at least in part on the updated radio resource management information for the cell.

16. The apparatus of claim 10, wherein the instructions executable by the processor to cause the apparatus to generate the list of communication beams associated with the cell are further executable by the processor to cause the apparatus to:
determine the subset of the set of communication beams for the cell based at least in part on one or more sensor measurements comprising the sensor measurement, mobility information for the UE, historical beam usage information, historical UE mobility information, a location of the cell, a range of the cell, one or more interfering objects associated with the cell, beam coverage information for the cell, a machine learning algorithm, or a combination thereof.

17. The apparatus of claim 10, wherein the one or more sensors comprise a camera assistance sensor, a radar support sensor, a positioning system sensor, or a combination thereof.

18. The apparatus of claim 10, wherein the message is transmitted to the second network device via an Xn interface.

19. A non-transitory computer-readable medium storing code for wireless communications at a first network device, the code comprising instructions executable by a processor to:
   obtain a sensor measurement using one or more sensors at the first network device;
   predict a route for a user equipment (UE) based at least in part on the sensor measurement;
   generate a list of communication beams associated with a cell based at least in part on the predicted route for the UE, the cell being configured with a set of communication beams and the list of communication beams indicating a subset of the set of communication beams for the cell; and
   transmit, to a second network device serving the cell, a message comprising the list of communication beams, a cell identifier for the cell, and an identifier of the UE corresponding to the predicted route.

20. The non-transitory computer-readable medium of claim 19, wherein the instructions are further executable by the processor to:
   receive, from the second network device and in response to the message comprising the list of communication beams, a second message comprising an acknowledgment for the list of communication beams.

21. The non-transitory computer-readable medium of claim 19, wherein the instructions are further executable by the processor to:
   generate a second list of communication beams associated with a second cell based at least in part on the predicted route for the UE, the second cell being configured with a second set of communication beams and the second list of communication beams indicating a second subset of the second set of communication beams for the second cell, wherein the message further comprises the second list of communication beams and a second cell identifier for the second cell and is further transmitted to a third network device serving the second cell.

22. The non-transitory computer-readable medium of claim 19, wherein the instructions are further executable by the processor to:
   generate a second list of communication beams associated with a second cell based at least in part on the predicted route for the UE, the second cell being configured with a second set of communication beams and the second list of communication beams indicating a second subset of the second set of communication beams for the second cell; and
   transmit, to a third network device serving the second cell, a second message comprising the second list of communication beams and a second cell identifier for the second cell.

23. The non-transitory computer-readable medium of claim 19, wherein the instructions are further executable by the processor to:
   trigger handover of the UE on the cell, wherein the message comprising the list of communication beams is transmitted to the second network device based at least in part on the triggered handover of the UE.

24. The non-transitory computer-readable medium of claim 19, wherein the instructions are further executable by the processor to:
   update radio resource management information for the cell based at least in part on the sensor measurement, wherein the message comprising the list of communication beams is transmitted to the second network device based at least in part on the updated radio resource management information for the cell.

25. The non-transitory computer-readable medium of claim 19, wherein the instructions executable to generate the list of communication beams associated with the cell are further executable by the processor to:
   determine the subset of the set of communication beams for the cell based at least in part on one or more sensor measurements comprising the sensor measurement, mobility information for the UE, historical beam usage information, historical UE mobility information, a location of the cell, a range of the cell, one or more interfering objects associated with the cell, beam coverage information for the cell, a machine learning algorithm, or a combination thereof.

26. The non-transitory computer-readable medium of claim 19, wherein the one or more sensors comprise a camera assistance sensor, a radar support sensor, a positioning system sensor, or a combination thereof.

27. An apparatus for wireless communications at a first network device, comprising:
   means for obtaining a sensor measurement using one or more sensors at the first network device;
   means for predicting a route for a user equipment (UE) based at least in part on the sensor measurement;
   means for generating a list of communication beams associated with a cell based at least in part on the predicted route for the UE, the cell being configured with a set of communication beams and the list of communication beams indicating a subset of the set of communication beams for the cell; and
   means for transmitting, to a second network device serving the cell, a message comprising the list of communication beams, a cell identifier for the cell, and an identifier of the UE corresponding to the predicted route.

28. The apparatus of claim 27, further comprising:
   means for receiving, from the second network device and in response to the message comprising the list of communication beams, a second message comprising an acknowledgment for the list of communication beams.

29. The apparatus of claim 27, further comprising:
   means for triggering handover of the UE on the cell, wherein the message comprising the list of communication beams is transmitted to the second network device based at least in part on the triggered handover of the UE.

30. The apparatus of claim 27, further comprising:
   means for updating radio resource management information for the cell based at least in part on the sensor measurement, wherein the message comprising the list of communication beams is transmitted to the second network device based at least in part on the updated radio resource management information for the cell.

* * * * *